US011046473B2

(12) United States Patent
Agerton et al.

(10) Patent No.: US 11,046,473 B2
(45) Date of Patent: Jun. 29, 2021

(54) BLOW MOLDED ARTICLE WITH VISUAL EFFECTS

(71) Applicant: The Procter & Gamble Company, Cincinnati, OH (US)

(72) Inventors: Mark Lewis Agerton, Mason, OH (US); Marc Andrew Mamak, Mason, OH (US); Bradley Scott Neufarth, Loveland, OH (US); Andrew Joseph Horton, Middletown, OH (US); Ioannis Constantine Constantinides, Wyoming, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 329 days.

(21) Appl. No.: 16/158,719

(22) Filed: Oct. 12, 2018

(65) Prior Publication Data
US 2020/0024021 A1 Jan. 23, 2020

Related U.S. Application Data

(60) Provisional application No. 62/699,493, filed on Jul. 17, 2018.

(51) Int. Cl.
*B65D 1/02* (2006.01)
*B29C 49/06* (2006.01)
(Continued)

(52) U.S. Cl.
CPC ............ *B65D 1/0215* (2013.01); *B29C 49/06* (2013.01); *B29C 49/221* (2013.01);
(Continued)

(58) Field of Classification Search
CPC ..... B65D 1/0215; B29C 49/06; B29C 49/221; B29C 45/1643; B29C 2049/228; B32B 2250/40; B32B 2250/03; B32B 2250/05; B32B 2439/60; B32B 2250/244; B32B 2250/44; B32B 2264/101; B32B 2264/102; B32B 2307/4026; B32B 2307/408;
(Continued)

(56) References Cited

U.S. PATENT DOCUMENTS 1,554,191 A 9/1925 Alexander
3,222,439 A 12/1965 Bolomey et al.
(Continued)

FOREIGN PATENT DOCUMENTS

CN 201484752 U 5/2010
DE 202004018510 U1 9/2005
(Continued)

OTHER PUBLICATIONS

All final and non-final office actions for U.S. Appl. No. 16/845,283.
(Continued)

*Primary Examiner* — James C Yager
(74) *Attorney, Agent, or Firm* — Alexandra S. Anoff

(57) ABSTRACT

A blow molded multilayer article with a hollow body defined by a wall with an inner surface and an outer surface. The outer surface has an axial color gradient and/or a gloss gradient. The wall has multiple layers and at least one layer contains an effect pigment and/or an opacifying pigment.

12 Claims, 32 Drawing Sheets

(51) Int. Cl.
  *B29C 49/22* (2006.01)
  *B29K 105/00* (2006.01)
  *B29K 67/00* (2006.01)
  *B29L 31/00* (2006.01)

(52) U.S. Cl.
  CPC .............. *B29B 2911/14153* (2013.01); *B29B 2911/14326* (2013.01); *B29B 2911/14973* (2013.01); *B29K 2067/003* (2013.01); *B29K 2105/0032* (2013.01); *B29L 2031/7158* (2013.01); *B32B 2250/03* (2013.01); *B32B 2250/05* (2013.01); *B32B 2250/40* (2013.01); *B32B 2439/60* (2013.01); *Y10T 428/139* (2015.01); *Y10T 428/1352* (2015.01); *Y10T 428/1393* (2015.01)

(58) Field of Classification Search
  CPC ........ B32B 2307/412; B32B 2307/546; B32B 2439/80; B32B 27/325; B32B 27/36; B32B 1/02; B32B 2264/105; B32B 2270/00; B32B 2272/00; B32B 2307/406; B32B 2307/41; B32B 2307/538; B32B 2307/738; B32B 2439/70; B32B 2203/00; B32B 3/263; B32B 7/023; B32B 27/08; B32B 27/18; B32B 27/302; B32B 27/304; B32B 27/32; B32B 27/327; B32B 27/365; Y10T 428/1352; Y10T 428/1393; Y10T 428/139; B29B 2911/14153; B29B 2911/14973; B29B 2911/14326; B29B 11/08; B29B 2911/14046; B29K 2105/0032; B29K 2067/003; B29K 2067/00; B29K 2995/0021; B29L 2031/7158
  See application file for complete search history.

(56) References Cited

U.S. PATENT DOCUMENTS

| | | | |
|---|---|---|---|
| 3,420,924 A * | 1/1969 | Mason et al. ........... | B29C 48/12 264/541 |
| 4,457,961 A | 7/1984 | Nakazawa | |
| 4,535,901 A | 8/1985 | Okudaira | |
| 4,868,026 A | 9/1989 | Shimizu | |
| 4,994,313 A | 2/1991 | Shimizu | |
| 5,628,957 A | 5/1997 | Collette et al. | |
| 5,849,224 A | 12/1998 | Valyi | |
| 6,663,822 B1 | 12/2003 | Cargill | |
| 6,929,836 B2 | 8/2005 | Kikuchi | |
| 7,828,890 B2 | 11/2010 | Henglein | |
| 8,097,317 B2 | 1/2012 | Katou | |
| 8,485,935 B2 | 7/2013 | Hecht | |
| 8,580,365 B2 | 11/2013 | Abe | |
| 8,734,923 B2 | 5/2014 | Shi | |
| 8,895,120 B2 | 11/2014 | Dierickx | |
| 8,968,147 B2 | 3/2015 | Hecht | |
| 9,000,068 B2 | 4/2015 | Trummer | |
| 9,862,157 B2 | 1/2018 | Hosokoshiyama | |
| 2002/0009565 A1 | 1/2002 | Fehn | |
| 2004/0194663 A1 | 10/2004 | Li | |
| 2005/0170113 A1 | 8/2005 | Hill | |
| 2005/0170114 A1 | 8/2005 | Hill | |
| 2006/0029823 A1 | 2/2006 | Brown | |
| 2008/0017076 A1 | 1/2008 | Noguchi | |
| 2009/0233026 A1 | 9/2009 | Akiyama | |
| 2012/0171401 A1 | 7/2012 | Katou | |
| 2012/0256356 A1 | 10/2012 | Akiyama | |
| 2013/0313217 A1 | 11/2013 | Yamamoto et al. | |
| 2014/0044904 A1 | 2/2014 | De Belder | |
| 2014/0054255 A1 | 2/2014 | Hosokoshiyama | |
| 2015/0079320 A1 | 3/2015 | Katou | |
| 2017/0021552 A1 | 1/2017 | Dygert | |
| 2017/0197351 A1 | 7/2017 | Chiba | |
| 2017/0259486 A1 | 9/2017 | Koerner | |
| 2019/0105805 A1 | 4/2019 | Dubuque | |
| 2019/0112091 A1 | 4/2019 | Neufarth | |
| 2020/0024021 A1 | 1/2020 | Agerton | |
| 2020/0122873 A1 | 4/2020 | Agerton | |
| 2020/0171727 A1 | 6/2020 | Witz | |
| 2020/0324455 A1 | 10/2020 | Agerton | |
| 2020/0324456 A1 | 10/2020 | Mamak | |

FOREIGN PATENT DOCUMENTS

| | | | |
|---|---|---|---|
| EP | 2231373 B1 | 7/2015 | |
| JP | S5381569 A | 7/1978 | |
| JP | 06171638 A | 6/1994 | |
| JP | 2970292 B2 | 11/1999 | |
| JP | 3134376 B2 | 2/2001 | |
| JP | 2005219760 A | 8/2005 | |
| JP | 2007223628 A | 6/2007 | |
| JP | 2009062059 A | 3/2009 | |
| JP | 5029879 B2 | 9/2012 | |
| JP | 6593187 B2 | 10/2019 | |
| WO | WO2007066508 A1 | 6/2007 | |
| WO | WO2016031150 A1 | 3/2016 | |

OTHER PUBLICATIONS

All final and non-final office actions for U.S. Appl. No. 16/845,295.
PCT International Search Report and Written Opinion for PCT/US2019/026939 dated Jul. 15, 2019.
PCT International Search Report and Written Opinion for PCT/US2019/040221 dated Aug. 30, 2019.
PCT International Search Report and Written Opinion for PCT/US2020/027614 dated Sep. 14, 2020.
PCT International Search Report and Written Opinion for PCT/US2020/027615 dated Jun. 25, 2020.
PCT Invitation to Pay Additional Fees, and, Where Applicable, Protest Fee, for PCT/US2020/027614 dated Jul. 24, 2020.
U.S. Appl. No. 16/381,125, filed Apr. 11, 2019, Agerton et al.
All final and non-final office actions for U.S. Appl. No. 16/158,841.
All final and non-final office actions for U.S. Appl. No. 16/381,125.
C-Mold Co-Injection, Chapter 20, Copyright 1996 Advanced CAE Technology, Inc.
European Search Report for 17196087.5 dated Mar. 29, 2018.
PCT International Search Report and Written Opinion for PCT/US2018/053683 dated Feb. 15, 2019.
The Preferential Heating process for PET flat or asymmetric containers on SBO Universal and SBO Compact blow molders, www.sidel.com, publication date unknown.
U.S. Appl. No. 17/144,281, filed Jan. 8, 2021, Neufarth et al.
U.S. Appl. No. 17/217,751, filed Mar. 30, 2021, Neufarth et al.
All final and non-final office actions for U.S. Appl. No. 17/144,281.
All final and non-final office actions for U.S. Appl. No. 17/217,751.

* cited by examiner

Ex. 3

Ex. 2

Ex. 1

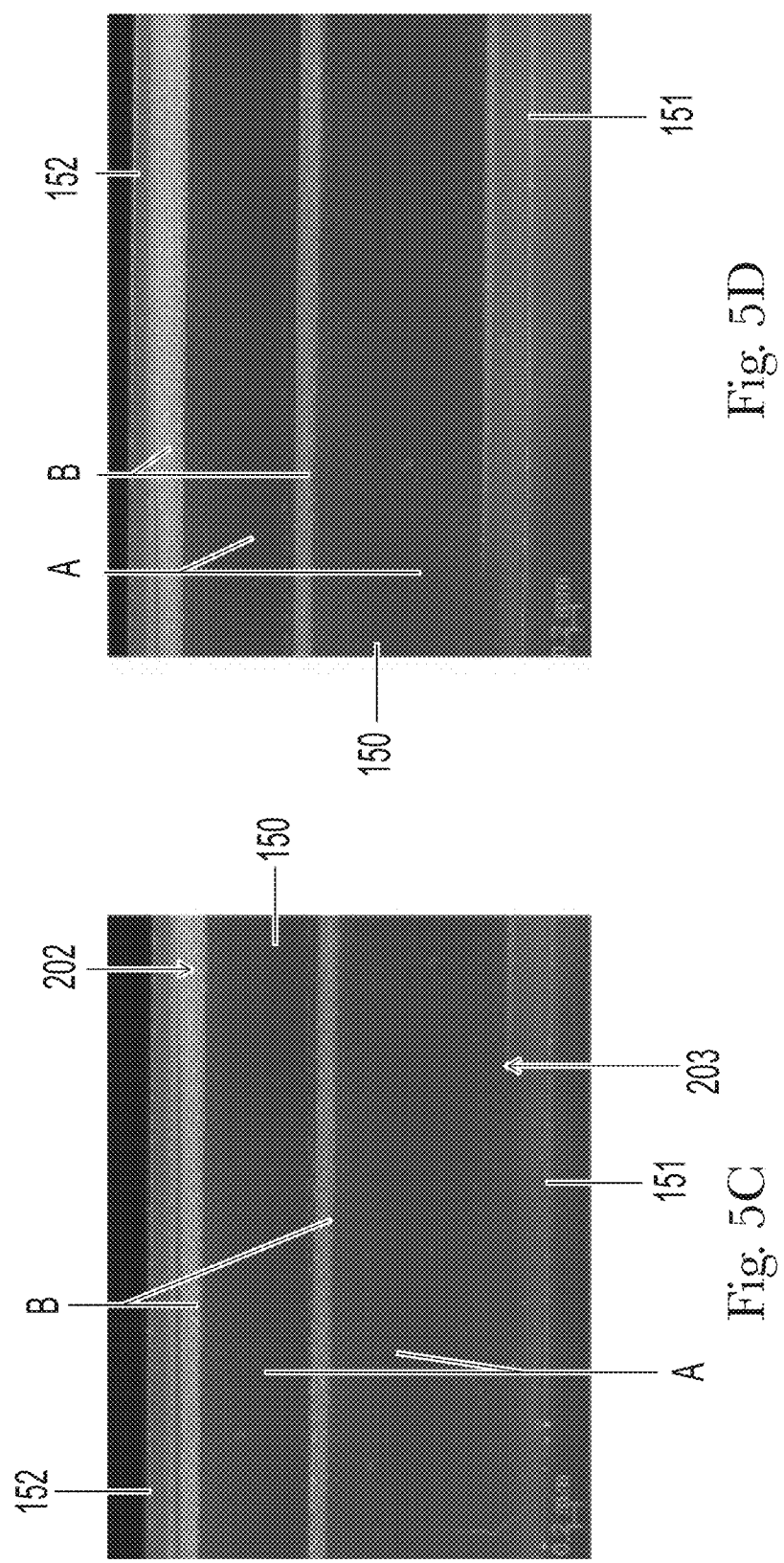

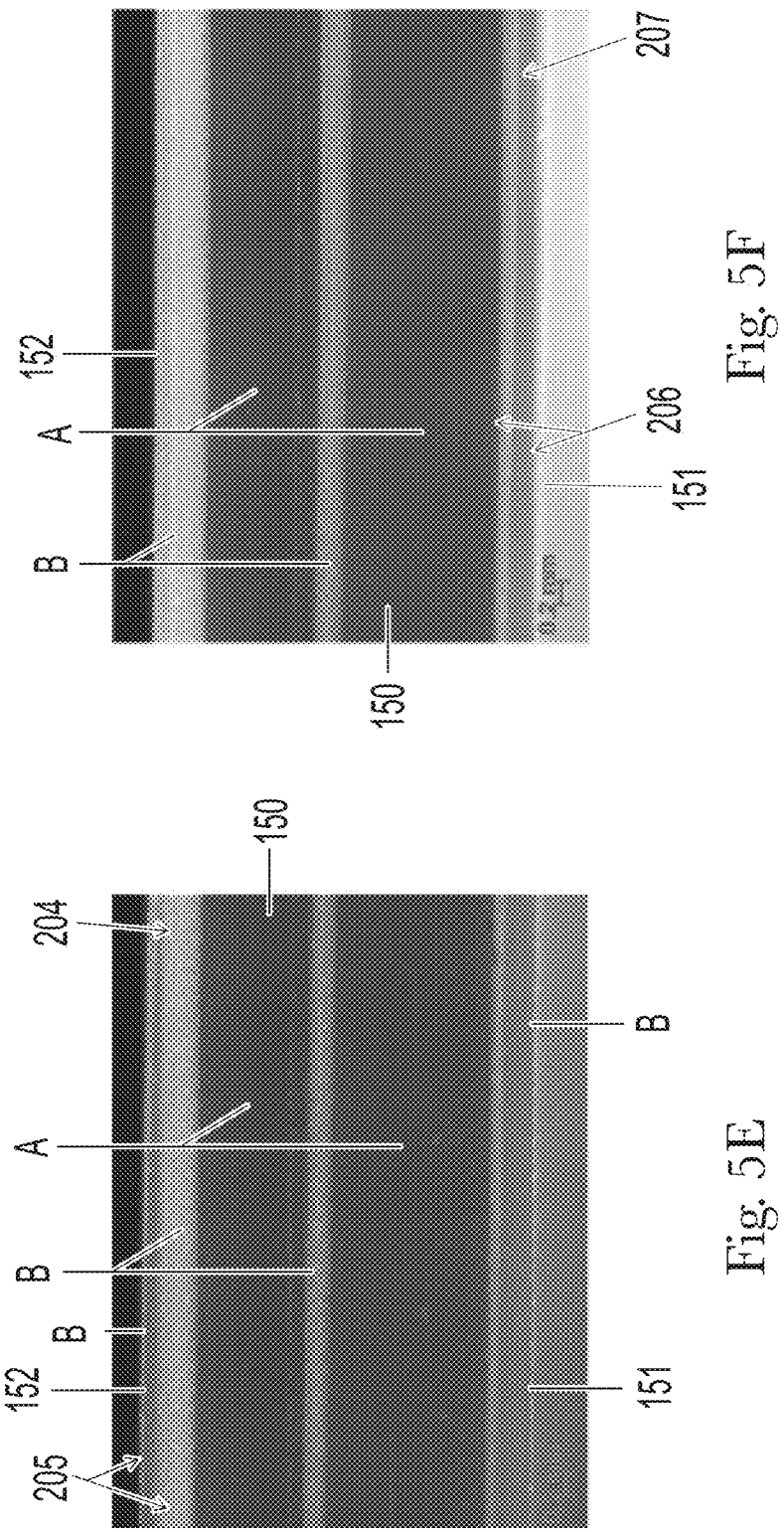

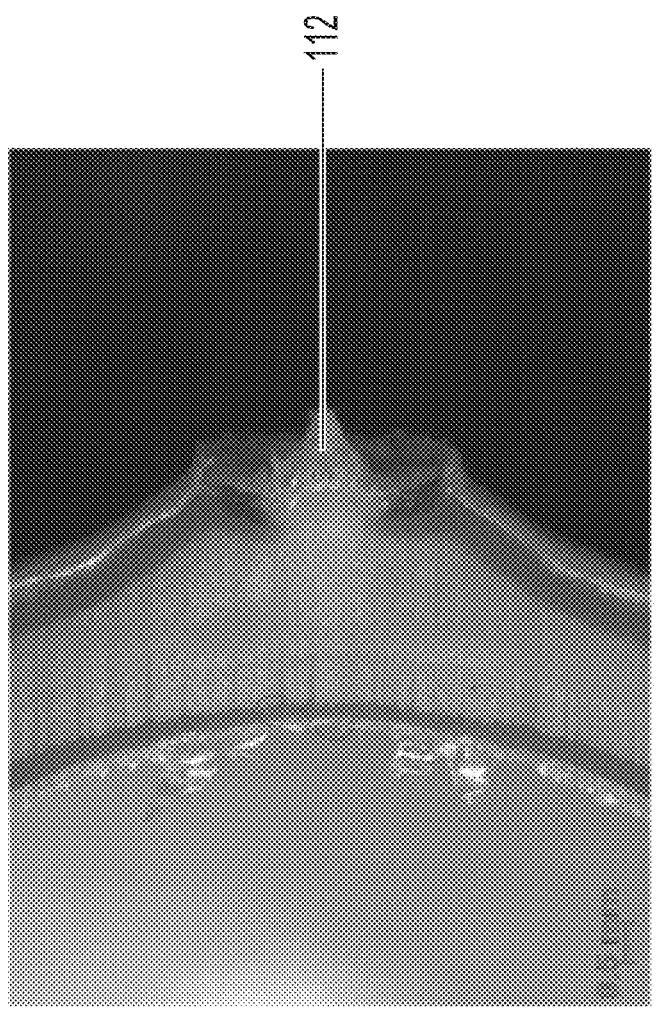

| | | First reading | Second Reading | Third Reading | Average | | | First reading | Second Reading | Third Reading | Average |
|---|---|---|---|---|---|---|---|---|---|---|---|
| Blue Front (Top) | | | | | | Blue Back (Top) | | | | | |
| | L | 73.74 | 73.74 | 73.74 | 73.74 | | L | 73.83 | 73.82 | 73.82 | 73.82 |
| | a | -20.09 | -20.08 | -20.09 | -20.09 | | a | -20.22 | -20.21 | -20.20 | -20.21 |
| | b | -13.45 | -13.44 | -13.44 | -13.44 | | b | -13.37 | -13.36 | -13.34 | -13.36 |
| Blue Front (Middle) | | | | | | Blue Back (Middle) | | | | | |
| | L | 85.77 | 85.77 | 85.77 | 85.77 | | L | 85.50 | 85.50 | 85.49 | 85.50 |
| | a | -10.08 | -10.07 | -10.06 | -10.07 | | a | -10.25 | -10.24 | -10.23 | -10.24 |
| | b | -5.81 | -5.79 | -5.78 | -5.79 | | b | -5.83 | -5.81 | -5.80 | -5.81 |
| Blue Front (Bottom) | | | | | | Blue Back (Bottom) | | | | | |
| | L | 94.13 | 94.12 | 94.11 | 94.12 | | L | 94.19 | 94.18 | 94.17 | 94.18 |
| | a | -0.11 | -0.09 | -0.10 | -0.10 | | a | -0.09 | -0.09 | -0.08 | -0.09 |
| | b | 2.81 | 2.80 | 2.81 | 2.81 | | b | 2.74 | 2.76 | 2.77 | 2.76 |

Fig. 6A

| | | First reading | Second Reading | Third Reading | Average |
|---|---|---|---|---|---|
| Yellow Front (Top) | | | | | |
| | L | 75.82 | 75.82 | 75.82 | 75.82 |
| | a | 10.51 | 10.52 | 10.51 | 10.51 |
| | b | 91.47 | 91.51 | 91.51 | 91.50 |
| Yellow Front (Middle) | | | | | |
| | L | 84.73 | 84.73 | 84.72 | 84.73 |
| | a | -1.43 | -1.43 | -1.44 | -1.43 |
| | b | 65.40 | 65.38 | 65.34 | 65.37 |
| Yellow Front (Bottom) | | | | | |
| | L | 93.88 | 93.87 | 93.86 | 93.87 |
| | a | -0.10 | -0.10 | -0.10 | -0.10 |
| | b | 2.56 | 2.56 | 2.56 | 2.56 |

| | | First reading | Second Reading | Third Reading | Average |
|---|---|---|---|---|---|
| Yellow Back (Top) | | | | | |
| | L | 76.05 | 76.05 | 76.05 | 76.05 |
| | a | 10.56 | 10.57 | 10.67 | 10.60 |
| | b | 92.20 | 92.17 | 92.19 | 92.19 |
| Yellow Back (Middle) | | | | | |
| | L | 85.10 | 85.10 | 85.09 | 85.10 |
| | a | -1.33 | -1.33 | -1.33 | -1.33 |
| | b | 67.22 | 67.21 | 67.17 | 67.20 |
| Yellow Back (Bottom) | | | | | |
| | L | 94.15 | 94.14 | 94.13 | 94.14 |
| | a | -0.11 | -0.09 | -0.09 | -0.10 |
| | b | 2.63 | 2.65 | 2.66 | 2.65 |

Fig. 6B

|  |  | First reading | Second Reading | Third Reading | Average |  |  | First reading | Second Reading | Third Reading | Average |
|---|---|---|---|---|---|---|---|---|---|---|---|
| Red Front (Top) |  |  |  |  |  | Red Back (Top) |  |  |  |  |  |
|  | L | 35.51 | 34.47 | 34.34 | 34.77 |  | L | 35.77 | 35.77 | 35.76 | 35.77 |
|  | a | 55.70 | 55.79 | 56.00 | 55.83 |  | a | 56.55 | 56.57 | 56.57 | 56.56 |
|  | b | 27.61 | 27.70 | 28.00 | 27.77 |  | b | 25.98 | 26.00 | 25.98 | 25.99 |
| Red Front (Middle) |  |  |  |  |  | Red Back (Middle) |  |  |  |  |  |
|  | L | 57.11 | 57.12 | 57.13 | 57.12 |  | L | 57.58 | 57.58 | 57.58 | 57.58 |
|  | a | 46.88 | 46.86 | 46.86 | 46.87 |  | a | 46.39 | 46.38 | 46.39 | 46.39 |
|  | b | 7.68 | 7.68 | 7.68 | 7.68 |  | b | 7.19 | 7.21 | 7.21 | 7.20 |
| Red Front (Bottom) |  |  |  |  |  | Red Back (Bottom) |  |  |  |  |  |
|  | L | 93.29 | 93.28 | 93.27 | 93.28 |  | L | 93.74 | 93.72 | 93.71 | 93.72 |
|  | a | -0.03 | -0.03 | -0.03 | -0.03 |  | a | -0.03 | -0.02 | -0.03 | -0.03 |
|  | b | 2.33 | 2.35 | 2.35 | 2.34 |  | b | 2.43 | 2.43 | 2.44 | 2.43 |

Fig. 6C

|  | Front | | | | Back | | | |
|---|---|---|---|---|---|---|---|---|
|  | First Reading | Second Reading | Third Reading | Average | First Reading | Second Reading | Third Reading | Average |
| 10 mm | 83.00 | 87.00 | 85.00 | 85.00 | 82.00 | 88.00 | 86.00 | 85.33 |
| 20 mm | 80.00 | 82.00 | 80.00 | 80.67 | 80.00 | 84.00 | 82.00 | 82.00 |
| 30 mm | 79.00 | 80.00 | 80.00 | 79.67 | 78.00 | 80.00 | 79.00 | 79.00 |
| 40 mm | 78.00 | 81.00 | 78.00 | 79.00 | 78.00 | 80.00 | 77.00 | 78.33 |
| 50 mm | 79.00 | 82.00 | 80.00 | 80.33 | 79.00 | 81.00 | 80.00 | 80.00 |
| 60 mm | 79.00 | 80.00 | 78.00 | 79.00 | 78.00 | 80.00 | 79.00 | 79.00 |
| 70 mm | 78.00 | 79.00 | 77.00 | 78.00 | 78.00 | 79.00 | 78.00 | 78.33 |
| 80 mm | 77.00 | 78.00 | 78.00 | 77.67 | 77.00 | 79.00 | 78.00 | 78.00 |
| 90 mm | 77.00 | 79.00 | 77.00 | 77.67 | 77.00 | 79.00 | 77.00 | 77.67 |
| 100 mm | 76.00 | 77.00 | 77.00 | 76.67 | 76.00 | 78.00 | 76.00 | 77.00 |
| 110 mm | 76.00 | 79.00 | 77.00 | 77.33 | 79.00 | 79.00 | 77.00 | 77.33 |
| 120 mm | 78.00 | 80.00 | 78.00 | 78.67 | 79.00 | 80.00 | 78.00 | 79.00 |
| 130 mm | 78.00 | 80.00 | 79.00 | 79.00 | 79.00 | 81.00 | 80.00 | 80.00 |
| 140 mm | 78.00 | 80.00 | 79.00 | 79.00 | 78.00 | 81.00 | 80.00 | 79.67 |
| 150 mm | 78.00 | 80.00 | 79.00 | 79.00 | 77.00 | 81.00 | 79.00 | 79.00 |

Fig. 7A

|  | Front | | | | Back | | | |
| --- | --- | --- | --- | --- | --- | --- | --- | --- |
|  | First Reading | Second Reading | Third Reading | Average | First Reading | Second Reading | Third Reading | Average |
| 10 mm | 73.00 | 80.00 | 80.00 | 77.67 | 74.00 | 79.00 | 76.00 | 76.33 |
| 20 mm | 73.00 | 81.00 | 77.00 | 77.00 | 75.00 | 80.00 | 75.00 | 76.67 |
| 30 mm | 74.00 | 81.00 | 79.00 | 78.00 | 76.00 | 81.00 | 75.00 | 77.33 |
| 40 mm | 75.00 | 82.00 | 80.00 | 79.00 | 76.00 | 79.00 | 75.00 | 76.67 |
| 50 mm | 77.00 | 83.00 | 80.00 | 80.00 | 77.00 | 79.00 | 77.00 | 77.67 |
| 60 mm | 79.00 | 84.00 | 82.00 | 81.67 | 76.00 | 80.00 | 79.00 | 78.33 |
| 70 mm | 81.00 | 85.00 | 83.00 | 83.00 | 79.00 | 82.00 | 80.00 | 80.33 |
| 80 mm | 81.00 | 84.00 | 82.00 | 82.33 | 81.00 | 82.00 | 80.00 | 81.00 |
| 90 mm | 82.00 | 85.00 | 84.00 | 83.67 | 82.00 | 85.00 | 84.00 | 83.67 |
| 100 mm | 87.00 | 89.00 | 87.00 | 87.67 | 87.00 | 88.00 | 87.00 | 87.33 |
| 110 mm | 84.00 | 86.00 | 85.00 | 85.00 | 85.00 | 86.00 | 84.00 | 85.00 |
| 120 mm | 81.00 | 85.00 | 83.00 | 83.00 | 82.00 | 84.00 | 82.00 | 82.67 |
| 130 mm | 79.00 | 83.00 | 81.00 | 81.00 | 80.00 | 82.00 | 80.00 | 80.67 |
| 140 mm | 77.00 | 83.00 | 79.00 | 79.67 | 81.00 | 81.00 | 78.00 | 80.00 |
| 150 mm | 74.00 | 81.00 | 79.00 | 78.00 | 75.00 | 78.00 | 76.00 | 76.33 |

Fig. 7C

|  | Front | | | | Back | | | |
|---|---|---|---|---|---|---|---|---|
|  | First Reading | Second Reading | Third Reading | Average | First Reading | Second Reading | Third Reading | Average |
| 10 mm | 97.00 | 95.00 | 97.00 | 96.33 | 95.00 | 96.00 | 95.00 | 95.33 |
| 20 mm | 95.00 | 97.00 | 95.00 | 95.67 | 94.00 | 96.00 | 94.00 | 94.67 |
| 30 mm | 95.00 | 97.00 | 95.00 | 95.67 | 94.00 | 96.00 | 95.00 | 95.00 |
| 40 mm | 95.00 | 97.00 | 94.00 | 95.33 | 93.00 | 96.00 | 95.00 | 94.67 |
| 50 mm | 94.00 | 97.00 | 94.00 | 95.00 | 93.00 | 95.00 | 95.00 | 94.33 |
| 60 mm | 95.00 | 96.00 | 95.00 | 95.33 | 94.00 | 95.00 | 94.00 | 94.33 |
| 70 mm | 93.00 | 94.00 | 94.00 | 93.67 | 92.00 | 93.00 | 92.00 | 92.33 |
| 80 mm | 91.00 | 92.00 | 92.00 | 91.67 | 90.00 | 91.00 | 90.00 | 90.33 |
| 90 mm | 89.00 | 91.00 | 90.00 | 90.00 | 89.00 | 90.00 | 89.00 | 89.33 |
| 100 mm | 89.00 | 89.00 | 90.00 | 90.00 | 89.00 | 90.00 | 88.00 | 89.00 |
| 110 mm | 87.00 | 87.00 | 88.00 | 88.00 | 87.00 | 87.00 | 86.00 | 86.67 |
| 120 mm | 83.00 | 85.00 | 85.00 | 85.00 | 83.00 | 85.00 | 83.00 | 83.67 |
| 130 mm | 81.00 | 85.00 | 83.00 | 83.00 | 81.00 | 84.00 | 82.00 | 82.33 |
| 140 mm | 82.00 | 85.00 | 83.00 | 83.33 | 80.00 | 84.00 | 81.00 | 81.67 |
| 150 mm | 77.00 | 81.00 | 78.00 | 78.67 | 77.00 | 81.00 | 78.00 | 78.67 |

Fig. 7E

| Herbal Blue | Front (Black Background) | | | | Back (Black Background) | | | |
|---|---|---|---|---|---|---|---|---|
| | First Reading | Second Reading | Third Reading | Average | First Reading | Second Reading | Third Reading | Average |
| 10 mm | 80.80 | 85.50 | 82.30 | 82.87 | 74.20 | 75.50 | 76.10 | 75.27 |
| 20 mm | 88.20 | 86.40 | 85.80 | 86.80 | 79.00 | 79.60 | 79.50 | 79.37 |
| 30 mm | 85.20 | 83.40 | 84.30 | 84.30 | 74.80 | 76.40 | 73.10 | 74.77 |
| 40 mm | 81.90 | 80.60 | 82.40 | 81.63 | 72.80 | 72.20 | 71.90 | 72.30 |
| 50 mm | 62.50 | 61.70 | 62.40 | 62.20 | 60.80 | 58.40 | 60.80 | 60.00 |
| 60 mm | 55.90 | 53.40 | 52.90 | 54.07 | 50.50 | 45.20 | 45.00 | 46.90 |
| 70 mm | 38.10 | 35.30 | 37.30 | 36.90 | 31.00 | 32.60 | 32.20 | 31.93 |
| 80 mm | 18.00 | 15.80 | 15.20 | 16.33 | 13.50 | 14.30 | 13.70 | 13.83 |
| 90 mm | 8.30 | 7.70 | 8.00 | 8.00 | 7.00 | 6.90 | 7.10 | 7.00 |
| 100 mm | 5.10 | 5.00 | 5.10 | 5.07 | 5.00 | 5.00 | 5.00 | 5.00 |
| 110 mm | 6.20 | 5.70 | 5.50 | 5.80 | 4.90 | 5.00 | 5.00 | 4.97 |
| 120 mm | 6.20 | 6.30 | 6.30 | 6.27 | 6.00 | 5.90 | 6.00 | 5.97 |
| 130 mm | 6.60 | 6.90 | 6.50 | 6.67 | 6.30 | 6.40 | 6.30 | 6.33 |
| 140 mm | 6.70 | 6.80 | 6.60 | 6.70 | 6.30 | 6.30 | 6.30 | 6.30 |
| 150 mm | 6.80 | 7.00 | 7.10 | 6.97 | 6.40 | 6.60 | 6.40 | 6.47 |

Fig. 8A

|  | Front | | | | Back | | | |
|---|---|---|---|---|---|---|---|---|
|  | First Reading | Second Reading | Third Reading | Average | First Reading | Second Reading | Third Reading | Average |
| 10 mm | 92.30 | 91.40 | 91.50 | 91.73 | 86.20 | 84.70 | 87.30 | 86.07 |
| 20 mm | 91.10 | 89.00 | 90.90 | 90.33 | 84.10 | 86.70 | 84.30 | 85.03 |
| 30 mm | 89.50 | 87.90 | 90.60 | 89.33 | 83.90 | 82.70 | 85.80 | 84.13 |
| 40 mm | 83.30 | 82.80 | 82.00 | 82.70 | 75.00 | 75.70 | 72.90 | 74.53 |
| 50 mm | 71.10 | 71.70 | 68.40 | 70.40 | 66.90 | 66.40 | 63.90 | 65.73 |
| 60 mm | 52.90 | 53.20 | 52.40 | 52.83 | 49.10 | 50.40 | 50.10 | 49.87 |
| 70 mm | 35.00 | 33.10 | 35.70 | 34.60 | 34.10 | 33.70 | 33.90 | 33.90 |
| 80 mm | 19.10 | 22.10 | 23.70 | 21.63 | 18.10 | 17.30 | 20.10 | 18.50 |
| 90 mm | 8.90 | 9.10 | 9.40 | 9.13 | 8.70 | 8.10 | 8.50 | 8.43 |
| 100 mm | 9.80 | 9.70 | 9.40 | 9.63 | 7.20 | 7.40 | 7.20 | 7.27 |
| 110 mm | 9.00 | 9.30 | 8.60 | 8.97 | 6.90 | 6.20 | 6.60 | 6.57 |
| 120 mm | 7.70 | 8.30 | 8.20 | 8.07 | 6.50 | 6.20 | 6.00 | 6.23 |
| 130 mm | 8.00 | 7.70 | 7.50 | 7.73 | 6.10 | 6.30 | 6.00 | 6.07 |
| 140 mm | 6.80 | 7.00 | 6.70 | 6.83 | 5.50 | 5.20 | 5.80 | 5.37 |
| 150 mm | 5.40 | 5.10 | 5.30 | 5.27 | 4.70 | 4.70 | 4.70 | 4.70 |

Fig. 8C

|  | Front | | | | Back | | | |
|---|---|---|---|---|---|---|---|---|
|  | First Reading | Second Reading | Third Reading | Average | First Reading | Second Reading | Third Reading | Average |
| 10 mm | 75.2 | 76.3 | 74.5 | 75.33 | 74.90 | 74.40 | 75.10 | 74.80 |
| 20 mm | 75.1 | 78.7 | 70.1 | 74.63 | 64.00 | 64.90 | 62.00 | 63.63 |
| 30 mm | 62.3 | 60.9 | 65.8 | 63.00 | 63.40 | 63.70 | 63.80 | 63.63 |
| 40 mm | 67.1 | 69.5 | 68.1 | 68.23 | 68.00 | 68.20 | 68.70 | 68.30 |
| 50 mm | 61 | 60.8 | 60.1 | 60.63 | 61.80 | 60.30 | 60.40 | 60.83 |
| 60 mm | 50.2 | 50.6 | 49.8 | 50.20 | 53.30 | 54.90 | 54.80 | 54.33 |
| 70 mm | 37.4 | 35.4 | 35.8 | 36.20 | 41.00 | 40.20 | 39.80 | 40.33 |
| 80 mm | 18.6 | 19.4 | 18.9 | 18.97 | 26.70 | 28.00 | 28.20 | 27.63 |
| 90 mm | 9.6 | 8.8 | 9.2 | 9.20 | 11.70 | 11.00 | 11.40 | 11.37 |
| 100 mm | 6.7 | 6.5 | 6.6 | 6.60 | 6.00 | 6.10 | 6.10 | 6.07 |
| 110 mm | 9.8 | 9.9 | 9.9 | 9.87 | 8.90 | 9.00 | 9.00 | 8.97 |
| 120 mm | 9.2 | 9.3 | 9.3 | 9.27 | 8.40 | 8.30 | 8.30 | 8.33 |
| 130 mm | 8.7 | 8.4 | 8.7 | 8.60 | 7.80 | 7.70 | 7.90 | 7.80 |
| 140 mm | 7.9 | 7.9 | 7.9 | 7.90 | 6.70 | 6.40 | 6.20 | 6.43 |
| 150 mm | 6.4 | 6.4 | 6.5 | 6.43 | 5.30 | 6.10 | 4.90 | 5.43 |

Fig. 8E

|  | Front | | | | Back | | | |
| --- | --- | --- | --- | --- | --- | --- | --- | --- |
|  | First Reading | Second Reading | Third Reading | Average | First Reading | Second Reading | Third Reading | Average |
| 35 mm | 2.40 | 2.16 | 2.18 | 2.25 | 2.44 | 2.21 | 2.34 | 2.33 |
| 45 mm | 2.26 | 2.23 | 2.15 | 2.21 | 2.73 | 2.34 | 3.23 | 2.77 |
| 55 mm | 2.58 | 2.66 | 1.93 | 2.39 | 3.40 | 3.58 | 3.47 | 3.48 |
| 65 mm | 2.60 | 2.36 | 2.73 | 2.56 | 4.15 | 3.83 | 4.71 | 4.23 |
| 75 mm | 4.57 | 4.70 | 4.06 | 4.44 | 4.93 | 5.40 | 5.37 | 5.23 |
| 85 mm | 5.62 | 4.32 | 4.31 | 4.75 | 8.28 | 8.91 | 8.93 | 8.71 |
| 95 mm | 7.11 | 6.75 | 6.49 | 6.78 | 9.53 | 11.30 | 10.00 | 10.28 |
| 105 mm | 9.18 | 9.08 | 9.94 | 9.40 | 11.42 | 13.33 | 11.38 | 12.04 |
| 115 mm | 17.57 | 17.40 | 17.34 | 17.44 | 18.48 | 23.33 | 20.61 | 20.81 |
| 125 mm | 23.75 | 22.75 | 22.16 | 22.89 | 26.50 | 26.57 | 26.11 | 26.39 |
| 135 mm | 31.93 | 34.05 | 37.25 | 34.41 | 36.99 | 35.18 | 34.29 | 35.49 |
| 145 mm | 33.28 | 31.02 | 34.14 | 32.81 | 30.20 | 32.74 | 33.77 | 32.24 |
| 155 mm | 24.69 | 25.52 | 24.69 | 24.97 | 24.93 | 25.38 | 26.42 | 25.58 |
| 165 mm | 25.25 | 21.56 | 25.29 | 24.03 | 24.03 | 24.00 | 24.59 | 24.21 |
| 175 mm | 22.20 | 21.91 | 21.59 | 21.90 | 23.16 | 23.98 | 24.25 | 23.80 |
| 185 mm | 19.99 | 20.51 | 21.89 | 20.80 | 19.41 | 19.27 | 17.36 | 18.68 |
| 195 mm | 20.57 | 20.51 | 18.95 | 20.01 | 19.96 | 20.06 | 19.42 | 19.81 |

Fig. 9A

|  | Front | | | | Back | | | |
|---|---|---|---|---|---|---|---|---|
|  | First Reading | Second Reading | Third Reading | Average | First Reading | Second Reading | Third Reading | Average |
| 35 mm | 1.69 | 2.06 | 2.07 | 1.94 | 1.75 | 1.75 | 1.66 | 1.72 |
| 45 mm | 2.18 | 2.04 | 2.05 | 2.09 | 1.59 | 1.74 | 1.77 | 1.70 |
| 55 mm | 2.50 | 2.70 | 2.47 | 2.56 | 1.91 | 1.46 | 1.92 | 1.76 |
| 65 mm | 2.70 | 2.91 | 2.74 | 2.78 | 1.94 | 1.75 | 1.77 | 1.82 |
| 75 mm | 3.87 | 4.02 | 5.45 | 4.45 | 2.26 | 2.29 | 2.24 | 2.26 |
| 85 mm | 8.66 | 8.74 | 8.82 | 8.74 | 2.89 | 2.88 | 2.89 | 2.89 |
| 95 mm | 8.21 | 9.18 | 8.99 | 8.79 | 7.21 | 6.80 | 7.03 | 7.01 |
| 105 mm | 11.89 | 10.61 | 10.56 | 11.02 | 10.15 | 10.05 | 11.65 | 10.62 |
| 115 mm | 16.99 | 17.78 | 18.83 | 17.87 | 17.81 | 15.74 | 14.78 | 16.11 |
| 125 mm | 22.96 | 22.55 | 21.13 | 22.21 | 22.54 | 20.68 | 20.94 | 21.39 |
| 135 mm | 21.41 | 19.01 | 21.55 | 20.66 | 19.88 | 20.32 | 19.59 | 19.93 |
| 145 mm | 21.58 | 20.02 | 18.91 | 20.17 | 22.86 | 23.14 | 21.42 | 22.47 |
| 155 mm | 19.57 | 20.77 | 20.65 | 20.33 | 21.37 | 23.10 | 22.13 | 22.20 |
| 165 mm | 22.33 | 20.49 | 21.68 | 21.50 | 20.86 | 20.71 | 20.86 | 20.81 |
| 175 mm | 28.57 | 29.44 | 23.72 | 27.24 | 27.82 | 27.96 | 25.94 | 27.24 |
| 185 mm | 33.19 | 32.40 | 32.68 | 32.76 | 31.39 | 28.30 | 29.26 | 29.65 |
| 195 mm | 18.78 | 18.57 | 21.00 | 19.45 | 21.05 | 20.32 | 20.27 | 20.55 |

Fig. 9C

|  | Front | | | | Back | | | |
| --- | --- | --- | --- | --- | --- | --- | --- | --- |
|  | First Reading | Second Reading | Third Reading | Average | First Reading | Second Reading | Third Reading | Average |
| 35 mm | 1.98 | 1.95 | 1.93 | 1.95 | 2.73 | 2.80 | 2.27 | 2.60 |
| 45 mm | 2.70 | 2.64 | 2.57 | 2.64 | 1.97 | 1.92 | 1.80 | 1.90 |
| 55 mm | 2.17 | 2.77 | 2.48 | 2.47 | 2.64 | 2.64 | 2.25 | 2.51 |
| 65 mm | 2.55 | 2.69 | 2.34 | 2.53 | 2.90 | 2.56 | 2.55 | 2.67 |
| 75 mm | 2.60 | 2.45 | 2.61 | 2.55 | 2.96 | 3.11 | 3.23 | 3.10 |
| 85 mm | 6.54 | 6.62 | 6.74 | 6.63 | 5.33 | 3.74 | 4.55 | 4.54 |
| 95 mm | 8.37 | 7.38 | 7.17 | 7.64 | 7.88 | 7.36 | 8.02 | 7.75 |
| 105 mm | 12.01 | 14.46 | 13.99 | 13.49 | 9.21 | 9.98 | 11.61 | 10.27 |
| 115 mm | 16.25 | 17.03 | 17.84 | 17.04 | 10.91 | 10.00 | 10.36 | 10.42 |
| 125 mm | 21.99 | 22.11 | 22.68 | 22.26 | 16.86 | 16.31 | 15.40 | 16.19 |
| 135 mm | 23.06 | 22.44 | 22.18 | 22.56 | 24.27 | 23.41 | 23.27 | 23.65 |
| 145 mm | 19.88 | 20.11 | 19.97 | 19.99 | 22.35 | 23.93 | 23.88 | 23.39 |
| 155 mm | 21.16 | 22.48 | 21.46 | 21.70 | 20.93 | 21.47 | 22.49 | 21.63 |
| 165 mm | 20.15 | 23.43 | 22.33 | 21.97 | 24.15 | 22.54 | 22.39 | 23.03 |
| 175 mm | 25.44 | 25.82 | 25.21 | 25.49 | 25.10 | 24.81 | 25.47 | 25.13 |
| 185 mm | 31.77 | 27.40 | 28.39 | 29.19 | 33.35 | 31.67 | 31.23 | 32.08 |
| 195 mm | 20.45 | 22.57 | 21.62 | 21.55 | 22.00 | 20.86 | 21.74 | 21.53 |

Fig. 9E

BLOW MOLDED ARTICLE WITH VISUAL EFFECTS

FIELD OF THE INVENTION

The invention is generally directed to blow molded articles with an appearance and surface roughness gradient, and more particularly to blow molded, multilayer articles having at least one layer that contains effect pigments and/or opacifying pigments that help to produce the appearance and surface roughness gradient and other visual effects. The invention relates also to preforms for making such articles and to methods for making these preforms and articles.

BACKGROUND OF THE INVENTION

Consumers want to purchase articles, particularly hair and beauty products in blow molded containers, that grab their attention by having a unique and/or premium appearance at the store shelf and/or webpage/app. During use, it is important that the consumer continues to be impressed by not only the article's appearance, but the function, feel, and integrity of the article.

To make eye-catching articles that connote luxury and quality, it can be desirable for the article to have an appearance gradient. It will be particularly attractive if the gradient appearance is combined with gradients in surface roughness which give rise to glossy and matte visual effects along with sensorial touch features such a gradient soft touch feel. Glossy visual effects generally require the article have a smooth outer surface that can enhance the degree of light reflected from that surface while matte visual effects generally derive from roughened outer surfaces. For example, specular reflectance is relatively higher for a smoother surface and diffuse reflectance is generally higher for a rougher surface.

It is desirable to combine textural features with a gradient having interplay between colors and/or effect pigments that give the article a lustrous, pearlescent, iridescent, shimmery, sparkly, and/or metallic effect. Effect pigments have angle dependent optical effects when dispersed within a medium such as a coating or plastic resin resulting from their platelet-like structure as well as their alignment within the medium. Additionally, it can be desirable for the article to have adequate opacity across the volume of the unit such that the fill line of the product remains hidden from the consumer.

Currently, some blow-molded articles with simple, non-angle dependent color gradients can be made by varying the thickness of a colored core. However, this approach does not have the ability to affect the textural features of the article, thus the article lacks the premium appearance. Additionally, this approach lacks the ability to control opacity of the article across its full volume. Finally, during use, these articles can be flimsy and the layers may separate (delamination). Approaches to mitigate delamination include the incorporation of adhesives between the layers and/or compatibilizers within the layers. Articles made using this method also tend to use more plastic than standard blow molded articles.

Also, it can be expensive to incorporate effect pigments and/or opacifying pigments into large scale blow molded articles because the weight percent loading of pigment particles required to achieve the desired optical and/or effect is difficult to afford within the context of high volume disposable packaging. Once dispersed within a blow molded article, the articles generally have poor gloss and high haze, which diminishes the optical appearance benefits of the pigments. Without being bound by theory it is believed this is due to the unevenness of the external surface of the articles when effect pigment particles and/or opacifying pigment particles are present due to a proportion of the particles which will be exposed near or at the surface of the article.

One solution to increase the gloss is to produce a preform and resultant container wherein an inner layer comprises a pigment and the outer layer is transparent and may also include a colorant. These products are generally manufactured by a two-step method (i.e. method where the materials making up the various layers are introduced in sequence, such as, co-molding/overmolding where the various layers are molded one over the other in subsequent steps or two step injection where the material of an outer layer is injected first into the mold cavity and is subsequently followed by the material of an inner layer). However, we have observed that in certain cases such construction method can lead to poor mechanical resistance of the finished article so that the layers delaminate during use.

One way to create a color gradient with effect pigments and/or opacifying pigments is to apply (e.g. by painting or printing) the gradient onto the blow molded article. However, this process adds complexity and cost to the article manufacturing and is generally not sustainable in the mass production of blow molded articles. Also, containers made with this method are generally less durable, since the paint/print can scratch off during filling, transit, and use.

As such, there remains a need for a blow molded article with an appearance gradient formed by incorporating colorants, including pigments, in alternate materials wherein the delamination of the materials is mitigated. There is further a need for a blow molded article with an appearance gradient where the colorants are incorporated into the materials include dyes, pigments and combinations of dyes and pigments. There is further a need for a blow molded article with an appearance gradient where the colorants incorporated into the materials include at least one effect pigment and/or opacifying pigment.

There also remains a need for a blow molded article with an appearance gradient related to gloss and/or matte finish or other non-color visual effects. At least a portion of the article has a glossy, pearlescent, and/or metallic finish. The article can have high opacity across its entire volume. The article is resistant to delamination without any adhesives or compatibilizers. Further, the process for forming the article can be simple, cost effective, and scalable to mass manufacture.

SUMMARY OF THE INVENTION

A blow molded multilayer article having a hollow body defined by a wall comprising an inner surface and an outer surface, wherein at least a first portion of the wall comprises at least five layers comprising at least two A-layers and at least two B-layers forming the outer surface and the inner surface; wherein the A-layers are transparent and optionally comprise a colored dye or pigment; wherein the B-layers comprise an effect pigment and/or an opacifying pigment; wherein the A-layers and B-layers comprise a thermoplastic resin; wherein the outer surface comprises an axial color gradient and/or a gloss gradient formed by constituents from the A-layers and B-layers.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

FIGS. 5A, 5B, 5C, 5D, 5E, 5F, 5G, 5H, SI, 5J and 5K are images taken using a stereo light microscope, each image progressively moves further from the preform neck to track the B-layer flow pattern, FIG. 5A is at the preform threads and FIG. 5K is taken at the preform gate;

FIG. 6A is a table showing the L*, a*, b* values for Example 1;

FIG. 6B is a table showing the L*, a*, b* values for Example 2;

FIG. 6C is a table showing the L*, a*, b* values for Example 3;

FIG. 7A is a table showing the % Opacity across the length of Example 1;

FIG. 7C is a table showing the % Opacity across the length of Example 2;

FIG. 7E is a table showing the % Opacity across the length of Example 2;

FIG. 8A is a table showing the gloss units (GUs) across the length of Example 1;

FIG. 8C is a table showing the GUs across the length of Example 2;

FIG. 8E is a table showing the GUs across the length of Example 3;

FIG. 9A is a table showing the surface roughness across the length of Example 1;

FIG. 9C is a table showing the surface roughness across the length of Example 2;

FIG. 9E is a table showing the surface roughness across the length of Example 3.

DETAILED DESCRIPTION OF THE INVENTION

Figure 1B:
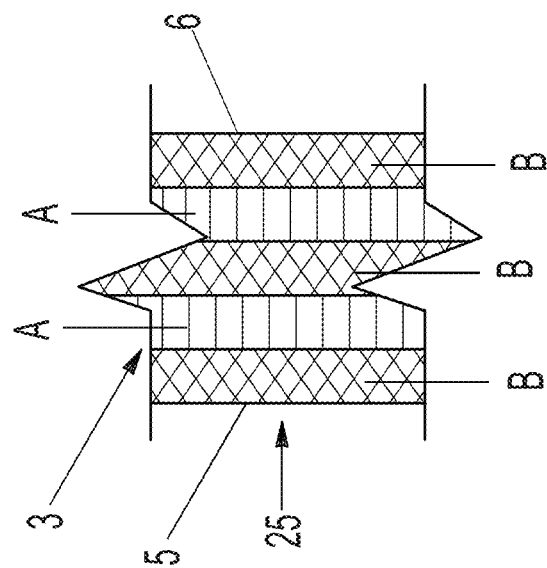
FIG. 1B is an enlarged schematic cross-section along axis-y.

While the specification concludes with claims particularly pointing out and distinctly claiming the invention, it is believed that the present disclosure will be better understood from the following description.

The eye-catching articles with an appearance and/or surface roughness gradient can be blow molded articles having a hollow body, such as containers and bottles, and can be made via a process of injection stretch blow molding (ISBM). FIG. 1 is a front view of an article 1, in this instance a bottle, with an axial color gradient, a gloss gradient, and a surface roughness gradient.

The blow molded articles can have walls defining the hollow body of the article. The walls can include multiple layers that are formed without adhesives by ISBM. The walls can include A-layers, which can be transparent and colored, and one or more B-layers, which can include the opacifying or effect pigments. Article 1 can appear opaque across the entire volume since across the entire article the wall contains at least one layer with an opacifying pigments and/or effect pigment.

The axial color gradient and/or the surface roughness gradient can be formed by the ISBM process. In the bottle of FIG. 1A, the area towards the top of the bottle or shoulder 31 can appear colored and glossy. In this glossy region, the outermost layer of the wall is an A-layer that can be transparent and can be colorless or colored. The glossy region can appear metallic and/or sparkly due to the effect pigments residing in the B-layer, which is located below the transparent A-layer, wherein such A-layer is the outermost layer of the article.

In the bottle in FIG. 1A, the area towards base 11 is a matte region, which can have a relatively rough surface texture, as compared to the glossy region, resulting in a matte finish along with a silky, soft-touch feel. This can be caused by effect pigments and/or opacifying pigments residing at or near the outer surface of the bottle. In this example, the wall in the matte region can include at least 5 layers where in the matte region the outer layer can be a B-layer that can contain effect pigment. In other examples, the B-layer can contain another opacifying pigment, such as an opacifier and/or an opaque absorption pigment.

The articles made by the blow molding process described herein and each article can be unique. For instance, the gradient is generally not the same on any of the articles. This uniqueness in combination with the combination of finishes (e.g. glossy, sparkly, metallic, pearlescent, and/or matte) contributes to an eye-catching, premium look of the articles.

As used herein, "appearance gradient" refers to a color gradient and a gloss gradient. The article can have a color gradient, in particular an axial color gradient and/or a gloss gradient.

As used herein, "article" refers to an individual blow molded hollow object for consumer usage, e.g. a container suitable for containing compositions. Non-limiting examples can include a bottle, a jar, a cup, a cap, a vial, a tottle, and the like. The article can be used in storage, packaging, transport/shipping, and/or for dispensing compositions container therein. Non-limiting volumes containable within the container are from about 10 mL to about 1000 mL, about 100 ml to about 900 mL, from about 200 mL to about 860 mL, from about 260 mL to about 760 mL, from about 280 mL to about 720 mL, from about 350 mL to about 500 mL. Alternatively, the container can have a volume up to 5 L or up to 20 L.

The compositions contained in the article may be any of a variety of compositions and including detergents (such as laundry or dishwashing detergents), fabric softeners and fragrance enhancers (such as Downy® Fresh Protect) food products including but not limited to liquid beverages and snacks, paper products (e.g., tissues, wipes), beauty care compositions (e.g., cosmetics, lotions, shampoos, conditioners, hair styling, deodorants and antiperspirants, and personal cleansing including washing, cleaning, cleansing, and/or exfoliating of the skin, including the face, hands, scalp, and body), oral care products (e.g., tooth paste, mouth wash, dental floss), medicines (antipyretics, analgesics, nasal decongestants, antihistamines, cough suppressants, supplements, anti-diarrheal, proton pump inhibitor and other heartburn remedies, anti-nausea, etc.) and the like. The compositions can include many forms, non-limiting examples of forms can include liquids, gels, powders, beads, solid bars, pacs (e.g. Tide PODS®), flakes, paste, tablets, capsules, ointments, filaments, fibers, and/or sheets (including paper sheets like toilet paper, facial tissues, and wipes).

The article can be a bottle for holding a product, for instance a liquid product like shampoo and/or conditioner.

As used herein, the term "blow molding" refers to a manufacturing process by which hollow plastic articles containing cavities, suitable to accommodate compositions are formed. Generally, there are three main types of blow molding: extrusion blow molding (EBM), injection blow molding (IBM) and molding injection stretch blow molding (ISBM).

As used herein, the term "color" includes any color, such as, e.g., white, black, red, orange, yellow, green, blue, violet, brown, and/or any other color, or declinations thereof.

As used herein, the term "color gradient" refers to a colored region having a first region and a second region, wherein the colored region includes any continuous function in L*a*b* color space. The gradient can be a continuous function of any or all of the L*, a* and/or b* values versus measurement location across or along the samples.

As used herein, "effect pigment" means one of two main classes of pigments" "metal effect pigments" and "special effect pigments." Metal effect pigments consist of only metallic particles. They create a metal-like luster by reflection of light at the surface of the metal platelets when having parallel alignment in their application system. Special effect pigments include all other platelet-like effect pigments which cannot be classified as "metal effect pigments". These are typically based on a substrate which has platelet shaped crystals (or particles) such as mica, (natural or synthetic) borosilicate glass, alumina flakes, silica flakes. These platelet shaped particles are typically coated with metal oxides.

As used herein, the term "gloss gradient" refers to a region having a first region and a second region. The gloss can vary continuously across the gradient and generally trends from a region of more gloss to less gloss, or vice versa. Since there are variations in the articles, there may be areas that appear to be an outlier and do not trend in the correct direction, however, across the gloss gradient, the gloss will generally trend in one direction.

As used herein, "opaque" means that layer has total luminous transmittance of less than 50%. The total luminous transmittance is measured in accordance with ASTM D1003.

Special effect pigments can include "pearlescent pigments" (also referred to as "pearl luster pigments"). Also suitable are "interference pigments" or "nacreous pigments" are based on the use of a laminar substrate such as mica or glass flake which has been coated with one or more dielectric layers including metal oxides, silicon dioxide, aluminum oxide and other oxides. These pigments can exhibit pearl-like luster as a result of reflection and refraction of light, and depending on the thickness of the metal oxide layer, they can also exhibit interference color effects. Non-limiting examples of pearlescent pigments can include titanium dioxide-coated mica, iron oxide-coated mica, and combinations thereof.

Effect pigments, including pearlescent pigments are marketed as such by suppliers including Merck and BASF.

As used herein, "preform" is a unit that has been subjected to preliminary, usually incomplete, shaping or molding, and is normally further processed to form an article. The preform is usually approximately "test-tube" shaped.

As used herein, "substantially free" means less than 3%, alternatively less than 2%, alternatively less than 1%, alternatively less than 0.5%, alternatively less than 0.25%, alternatively less than 0.1%, alternatively less than 0.05%, alternatively less than 0.01%, alternatively less than 0.001%, and/or alternatively free of. As used herein, "free of" means 0%.

As used herein, the term "surface roughness gradient" refers to a region having a first region and a second region. The surface roughness can vary continuously across the gradient and generally trends from a region of more surface roughness to less surface roughness, or vice versa. Since there are variations in the articles, there may be areas that appear to be an outlier and do not trend in the correct direction, however, across the surface roughness gradient, the surface roughness and gloss will generally trend in one direction.

As used herein, "transparent" means that layer has total luminous transmittance of 50% or more and reflected haze of less than 5 haze units. The total luminous transmittance is measured in accordance with ASTM D1003, the reflected haze is measured in accordance with ASTM E430.

As used herein, the terms "include," "includes," and "including," are meant to be non-limiting and are understood to mean "comprise," "comprises," and "comprising," respectively.

All percentages, parts and ratios are based upon the total weight of the compositions of the present invention, unless otherwise specified. All such weights as they pertain to listed ingredients are based on the active level and, therefore, do not include carriers or by-products that may be included in commercially available materials.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Where amount ranges are given, these are to be understood as being the total amount of said ingredient in the composition, or where more than one species fall within the scope of the ingredient definition, the total amount of all ingredients fitting that definition, in the composition. For example, if the composition comprises from 1% to 5% fatty alcohol, then a composition comprising 2% stearyl alcohol and 1% cetyl alcohol and no other fatty alcohol, would fall within this scope.

FIG. 1A is a front view of an article 1 with an appearance gradient, including an axial color gradient and a gloss gradient, and a surface roughness gradient. The article 1 has a body 2 and a neck 4 having screw thread notches 41 on the outer surface and orifice 42, an opening leading to the hollow body of the article. The body has base 11 at the lower end and shoulder 31 at the upper end. In the example in FIG. 1A, the appearance gradient and the surface roughness gradient is visible on the outer surface of body 2.

The outer surface of the body 2 can have a matte region 10, located towards the bottom of article 1 and can include base 11, and a glossy region 30, located towards the top of article 1 and can include shoulder 311. The gloss 20° decreases between glossy region 30 and pearlescent region 10 and the surface roughness increases between glossy region 30 and matte region, moving down the length of the body 2. Other arrangements of the matte region and glossy region are possible. In some examples, the surface roughness gradient is reversed and the glossy region towards the bottom of the article and the matte region is towards the top of the article and in other examples the article can contain multiple gradients such as extending from the mid-point of the article.

Figure 1A:
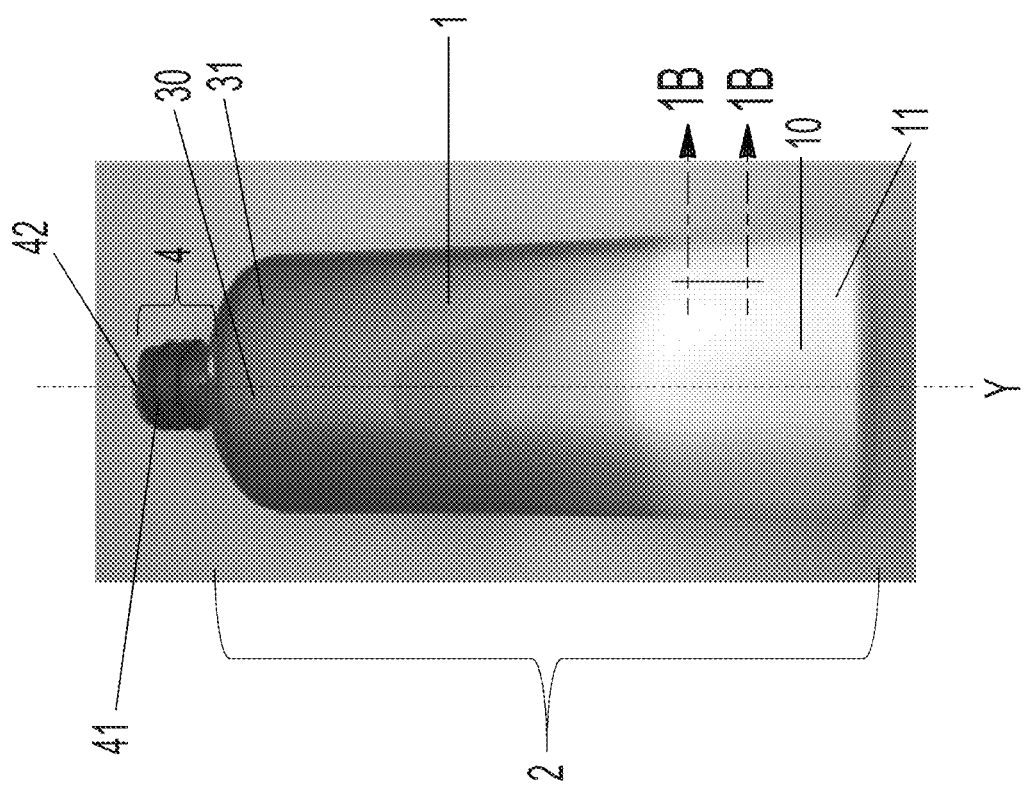
FIG. 1A is a front view of an article with an appearance (color and gloss) and surface roughness gradient.

FIG. 1B is schematic of an enlarged cross section along axis-y of FIG. 1A. A hollow body 25 defined by wall 3 having an inner surface 5 and an outer surface 6 and can be formed without adhesives (or substantially free of adhesives) by ISBM. The structure in FIG. 1B has at least five layers: three B-layers (B) and two A-layers (A).

The B-layers can include an effect pigment and/or an opacifying pigment.

The A-layer can be transparent and can include a pigment or soluble dye. The pigment or dye can be colored. Alternatively, the A-layer can be colorless. The A-layer can be free of or substantially free of pigments and/or of particles having their largest dimension greater than about 150 nm or between about 150 nm and 5000 nm.

Alternatively, the A-layer can include a pigment, the A-layer can still be transparent because the pigments can be in a matrix where the difference between the refractive index of the pigment (which depends on wavelength) and that of the matrix is low, and when the particle size of the pigment is below that which Mie scattering occurs (typically a largest particle dimension of about 100 nm or less). The A-layer can contain opaque absorption pigments and still be transparent, if the content of the layer in opaque absorption pigments is sufficiently small.

In FIG. 1B, one of the B-layers forms the outer surface of the wall and thus the effect pigment and/or opacifying pigment will be visible to the consumer at the store shelf or during normal use of the product. The 5 layers can form the entire wall in the pearlescent area or there can be additional layers. Due to the manufacturing process, the B-layer is often spliced into additional forks that appear as thin streams in the cross section of the wall. In the final article, the B-layer can contain from about 0.01% to about 10%, alternatively from about 0.5% to about 7.5%, and alternatively from about 1% to about 5%, by weight of the B-layer, pigment.

The average panel wall thickness can be from about 200 µm to about 5 mm, alternatively from about 250 µm to about 2.5 mm, alternatively from about 300 µm to about 2 mm, alternatively from about 350 µm to about 1.5 mm, and alternatively from about 375 µm to about 1.4 mm. The average panel wall thickness can be determined using the Local Wall Thickness method, described hereafter. The average local wall thickness can vary by less than 20% across the volume, alternatively less than 15%, alternatively less than 10%, and alternatively less than 10%.

The average local wall thickness can be substantially uniform across the body of the article, even though the ratio of the A-layer to the B-layer can vary across the length of the article and the number of layers and amount of forking varies. The ratio of A-layer to B-layer in the pearlescent region is from about 0.4 to about 2.5. The ratio of A-layer to B-layer in the glossy region is from about 2 to about 25, alternatively from about 5 to about 25, alternatively from about 10 to about 25, and alternatively from about 15 to about 25.

When the matte region contains an effect pigment it can have a luster resembling mother-of-pearl. To the touch, the matte region can have a silky, matte, soft feel. The matte region does not appear glossy, since it can have a higher surface roughness and/or lower gloss. The matte region can be formed by pigments at or near the outer surface of the body.

Figure 2A:
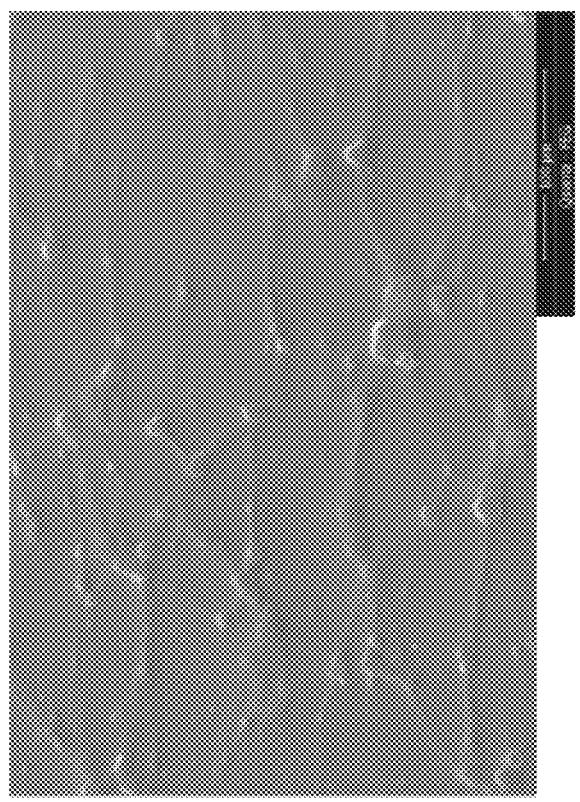
FIG. 2A is a scanning electron microscope (SEM) image of the outer surface of the article at the matte region at 500× magnification.
Figure 2B:
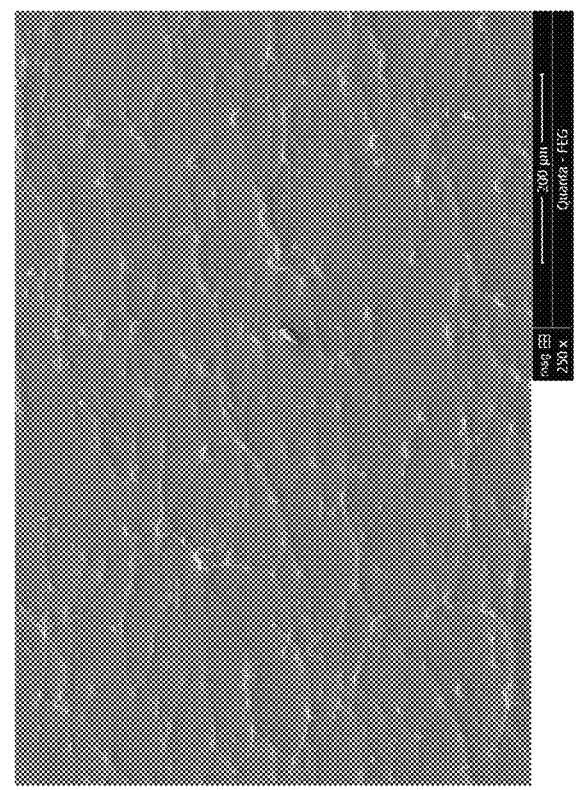
FIG. 2B is an SEM image of the outer surface of the article at the matte region at 250× magnification.

FIG. 2A is an SEM image of the outer surface at the matte region at 500× magnification and FIG. 2B is an SEM image of the outer surface of the article at the matte region at 1000× magnification. Under this magnification, the surface does not appear smooth. Instead, there is an interesting stretch morphology originating from the effect pigment platelets near or at the surface. It looks like there is a "spider web" connecting the effect pigment platelets that form the.

In contrast to the matte region, the glossy region can appear glossy and at some angles can appear highly reflective or metallic. The glossy finish can be formed by a transparent layer on the outer surface of the article. The presence of the A-layer on the outer surface of the article can allow the B-layer comprising the effect pigments to be visible from outside and, at the same time provides the article with a high level of gloss. Without being bound by theory, it is also believed that the presence of a glossy surface at a distance from the opaque surface of the B-layer comprising the effect pigments, provides two slightly shifted focal points that can give the viewer an impression of depth. This glossy region can contribute to a premium appearance of the article.

It has been surprisingly found that in articles according to the invention, the effect pigment particles in the B-layer can be predominantly oriented so that their face is parallel to the surface of the article. Without being bound by theory, it is believed that the ratio of oriented versus mal-oriented platelets is higher may be due to a combination of factors including the fact that the interface between each stream experiences higher shear versus similar locations in a monolayer article where the effect pigments are dispersed in the entire wall of the article which is thicker (at parity mechanical strength of the article) than the B-layer sandwiched between A-layers. In monolayer articles the particles are less concentrated in the region of high shear thus they have more free space to rotate 360° during the injection molding process while, in a multilayer article, the B-layer, is much thinner as it only represents a portion of the total thickness of the article's wall, so that the injection molding and stretching steps provide for more optimum orientation of a larger percentage of platelet like pigment particles.

It has further been found that the tendency for the platelet effect pigments to orient parallel to the surface of the article persist even when the article is irregularly shaped. As such, the shape of the article can be further used to modify the visual effects generated by the article from the point of view of a person viewing the article, depending on the orientation of the article when being viewed.

Figure 2D:
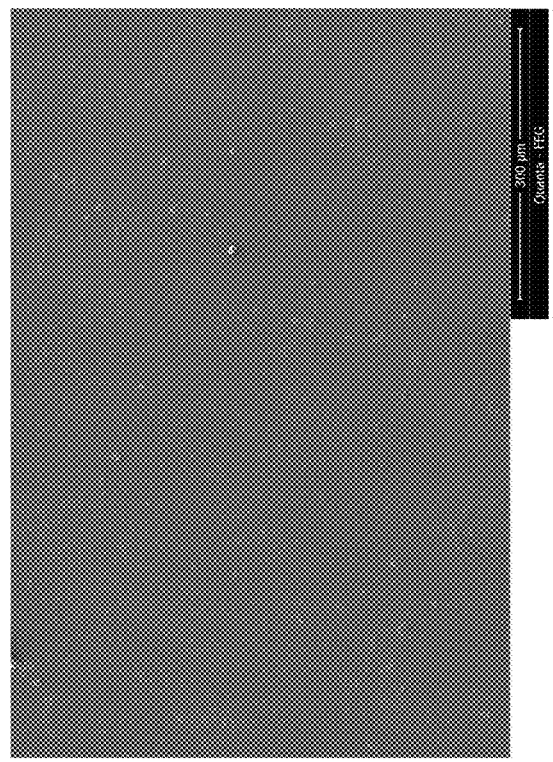
FIG. 2D is an SEM image of the outer surface of the article at an area between the glossy region and the matte region where the texture and color is continuously changing at 250× magnification.
Figure 2C:
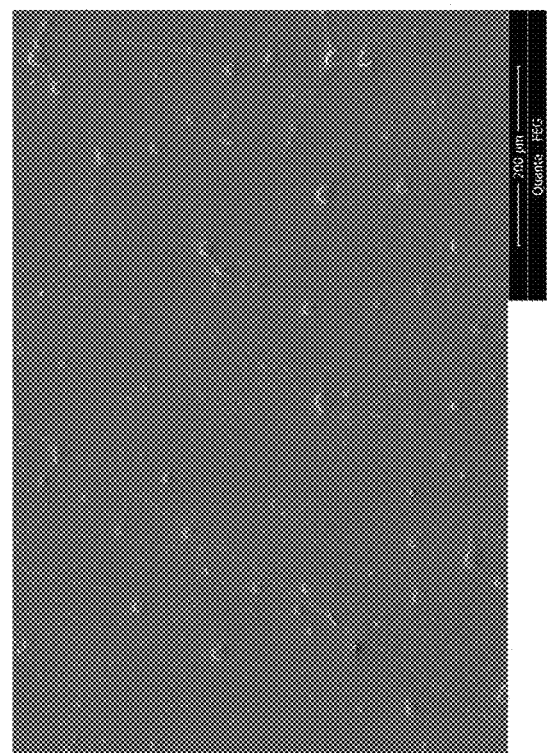
FIG. 2C is an SEM image of the outer surface of the article at the glossy region at 250× magnification.

FIG. 2C is an SEM image of the outer surface of the article at the glossy region at 1000× magnification. In this image, a smaller amount of platelets are still visible at the surface, however, the stretch morphology is not visible. There are presumably so few platelets near or at the surface that the optical response is largely unaffected and therefore exhibits high gloss.

Between the glossy region and the matte region is an area of transition where the color and/or texture of the bottle changes continuously. During the transition, the effect pigment is on the outer surface at some points and the transparent gloss is present at others, this can result in a color change and/or texture change that appears continuous and gradual as visually perceptible to a consumer. FIG. 2D is an SEM image of the outer surface of the article at the transition region at 1000× magnification. The platelet particles are still visible at the surface and some of the stretch morphology is present and less pronounced.

Figure 3C:
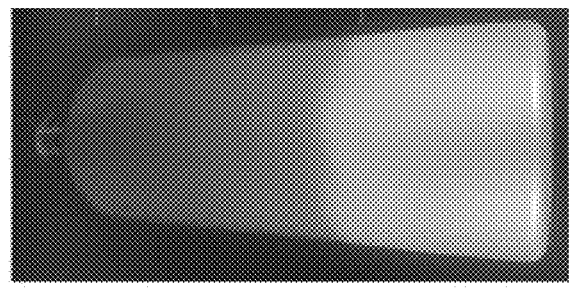
FIGS. 3A, 3B, and 3C show front views of articles with appearance gradients (color and gloss) and surface roughness gradient.
Figure 3B:
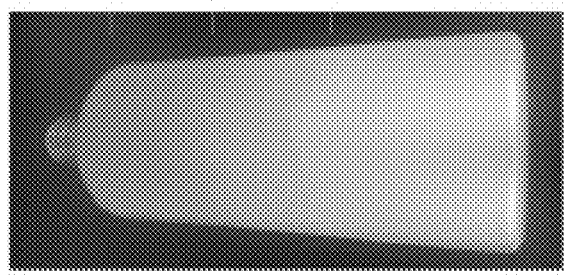
Figure 3A:
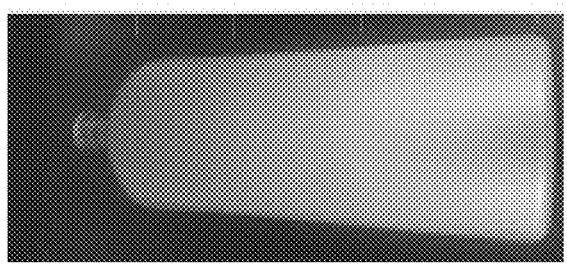

Interestingly, the transition from the first region to the second region varies, even when the preforms and bottles are made according to the same manufacturing process. This variation can be seen in FIGS. 3A, 3B, and 3C, corresponding to Examples 1, 2, and 3, respectively, and described in Table 1 and Table 3, discussed hereafter. In FIGS. 3A, 3B, and 3C, the area base at the base is a shade of white that can look and feel pearlescent and the area near the shoulder is glossy and a saturated color (FIG. 3A is blue, FIG. 3B is golden, and FIG. 3C is red). The transition from white to color (and pearlescent to glossy) is different on each bottle. The noticeable transition occurs at a slightly different point on each bottle and is a slightly different shape. Thus, each bottle is unique, which can have a handcrafted premium look that is eye-catching and appealing to consumers.

Figure 4A:
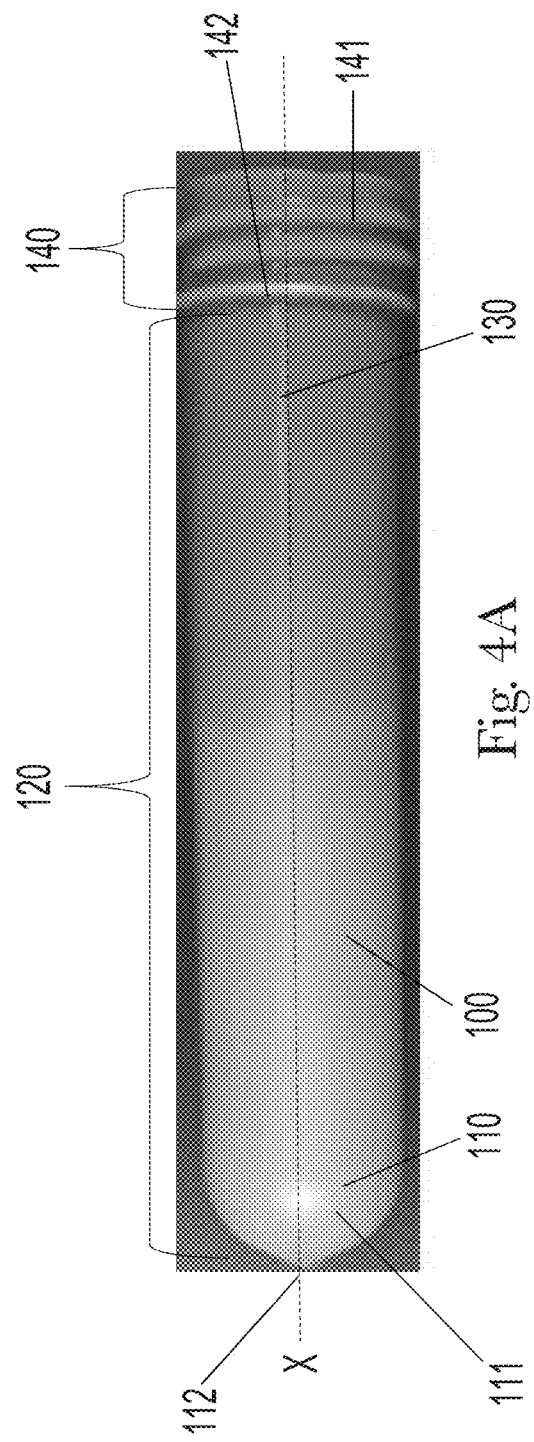
FIG. 4A is a front view of a preform with an appearance gradient (color and gloss) and surface roughness gradient.

FIG. 4A is a front view of a preform 100 with an appearance gradient and a surface roughness gradient. The preform has a cylindrical body 120 closed at its lower end by a semi-spherical bottom 111 having a gate imprint 112 at the bottom center and a cylindrical neck 140 having screw thread notches 141 on the outer peripheral wall and having a brim-like neck ring 142 at the boundary between the neck 140 and the body 120. The body can have a matte region 110 and a glossy region 130.

Figure 4B:
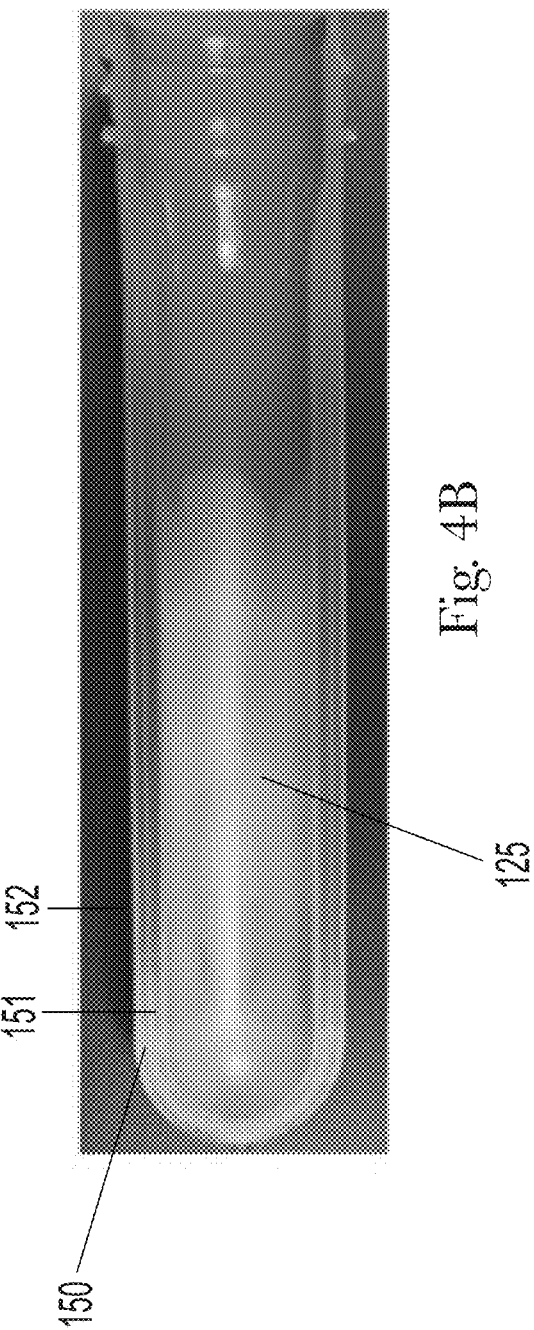
FIG. 4B is a cross-sectional view of the preform of FIG. 4A along axis-x.

In FIG. 4B the cross-sectional view along axis-x and shows a hollow body 125 defined by wall 150 of the preform. Wall 150 has an inner surface 151 and an outer surface 152. Wall 150 has multiple layers. As can be seen in FIG. 4B and FIGS. 5A-K, described hereafter, the A-layers, B-layers, and forking changes across the length of the article. FIG. 4B shows that the amount of effect pigment on the outer surface varies over the length of the article, which can help to create the color and surface roughness gradient.

Figure 5B:
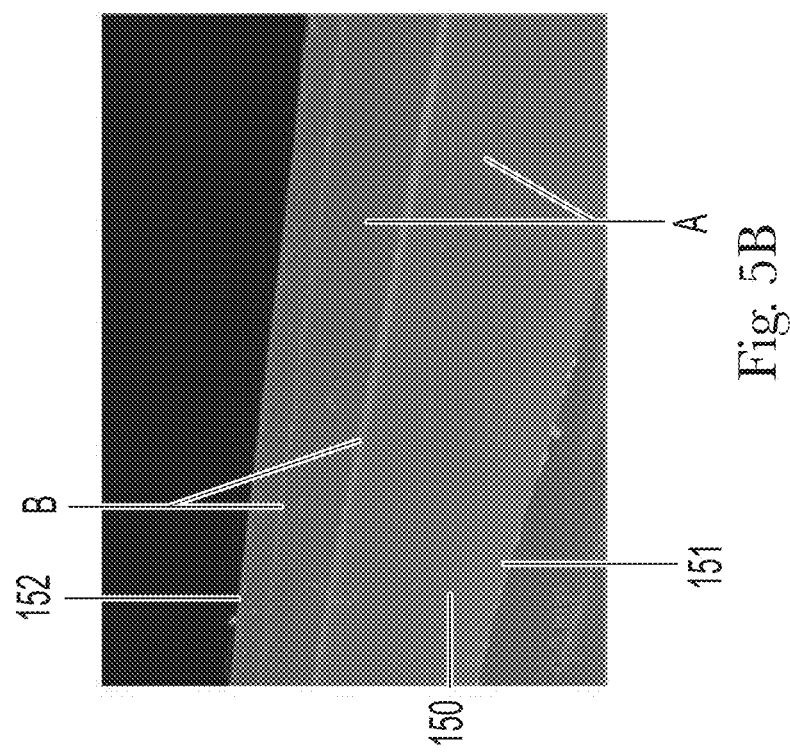
Figure 5A:
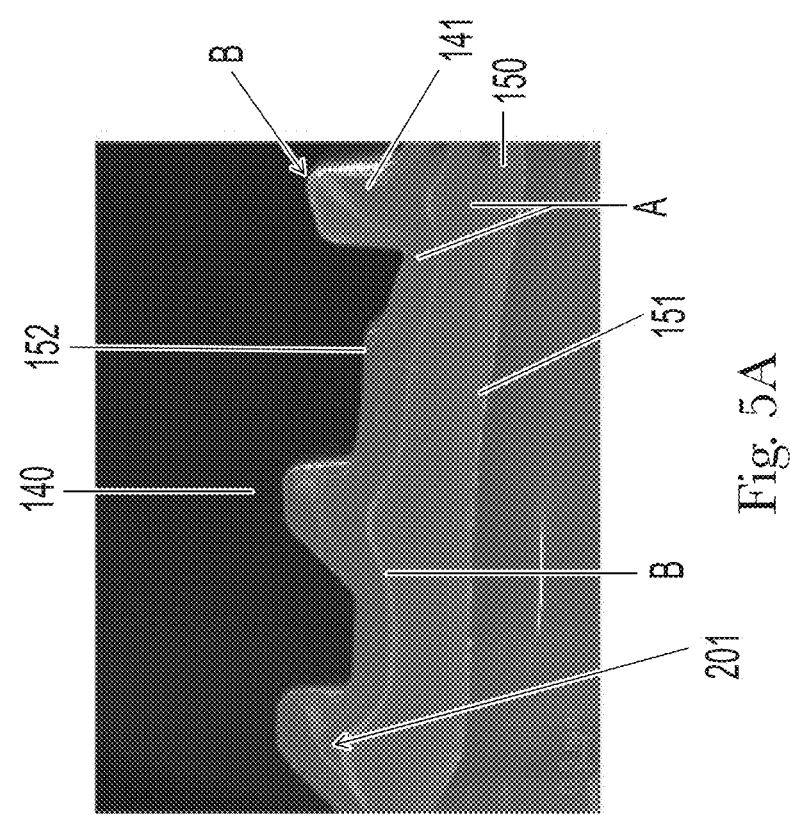

FIG. 5A-K are images taken under a stereo light microscope of wall 150 with inner surface 151 and outer surface 152 at different sections along the length of preform 150. FIGS. 5A-5B and 5K are at 10× magnification and FIGS. 5C-5J are at 20×. Each image progressively moves further from the preform neck to track the B-layer flow pattern. FIGS. 5A-5I show the layers and imperfections (e.g. forks in the layers to form multiple streams) in a preform. The layers and imperfections from the preform will be present in the article after blow molding. The aspect ratio of the finished article to the preform is generally about 8:1, however other aspect ratios could also work.

FIG. 5A shows a section in neck 140 that includes the screw thread notches 141. Multiple A-layers (A) and B-layers (B) can be seen. Interestingly, the B-layer is on the outer surface on the third thread (at the right side of the image). This means that the effect pigment is visible to the consumer in the neck and/or at the threads. Further, there is a fork 201, indicating that the B-layer can fork across the length of the preform.

FIG. 5B shows a section, probably right below the neck. To a consumer (without a microscope), this section will appear glossy and colored. The effect pigments underneath the A-layer, the color can appear metallic, sparkly, and/or shimmery. The inner surface 151 and the outer surface 152 are mostly A-layer. It is difficult to tell, even under microscopy, but there may be some effect pigment deposited on the outer layer. The B-layer is split into at least two streams that are visible in FIG. 5B.

FIG. 5C shows a section, closer to the bottom than the section in FIG. 5B. In FIG. 5C, the B-layer is thicker than in FIG. 5B. The outer surface 152 is generally composed of the transparent A. It is difficult to tell, even under microscopy, but there may be some effect pigment deposited on the outer layer. The fork in the B-layer closes, as indicated on FIG. 5C at 201. And another B-layer starts, as indicated on FIG. 5C at 202.

FIG. 5D shows a section, closer to the bottom than the section in FIG. 5C, that shows the non-symmetrical layer distribution in the layer distribution, including the B-layer distribution. In FIGS. 5C and 5D, the thickest B-layer is near the outer surface, although there is not a thick B-layer at the outer surface.

FIG. 5E shows a section, closer to the bottom than the section in FIG. 5D. In this image, it is likely that there is a very thin B-layer at the outer surface 152 and there is forking 205 between the outer-most B-layers. As indicated at 204 in FIG. 5E, the fork also appears to be closing. There is also an apparent B-layer on inner surface 151.

FIG. 5F shows a section, closer to the bottom, than the section in 5E. In this image, there is a thicker B-layer at outer surface 152. To a consumer (without a microscope), this section of the preform will probably appear pearlescent and in this instance white. This is because the thick layer of the effect pigment is not transparent and none of the colored, transparent region will be visually perceptible to a viewer. The B-layers towards the inner surface 151 are still forked 206, however, the fork is beginning to close at 207.

Figure 5H:
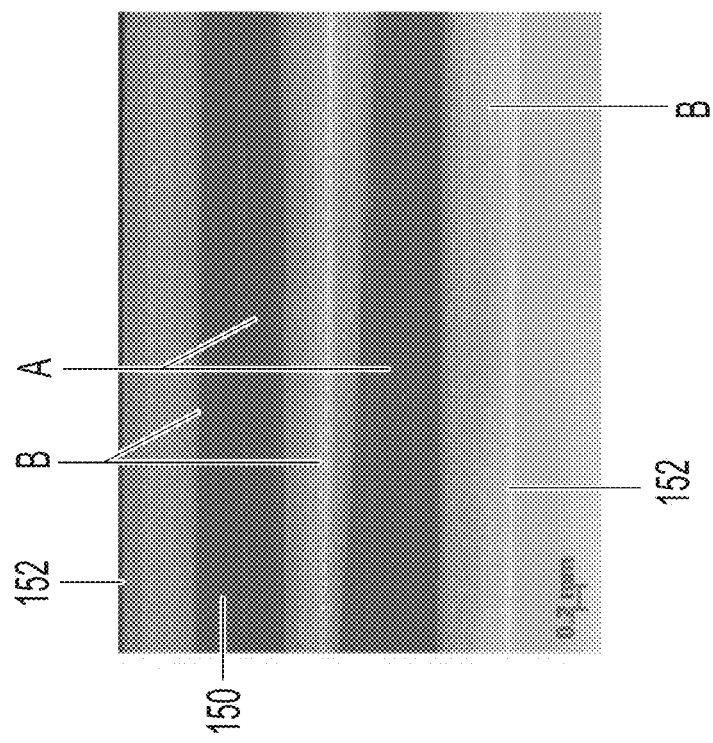
Figure 5G:
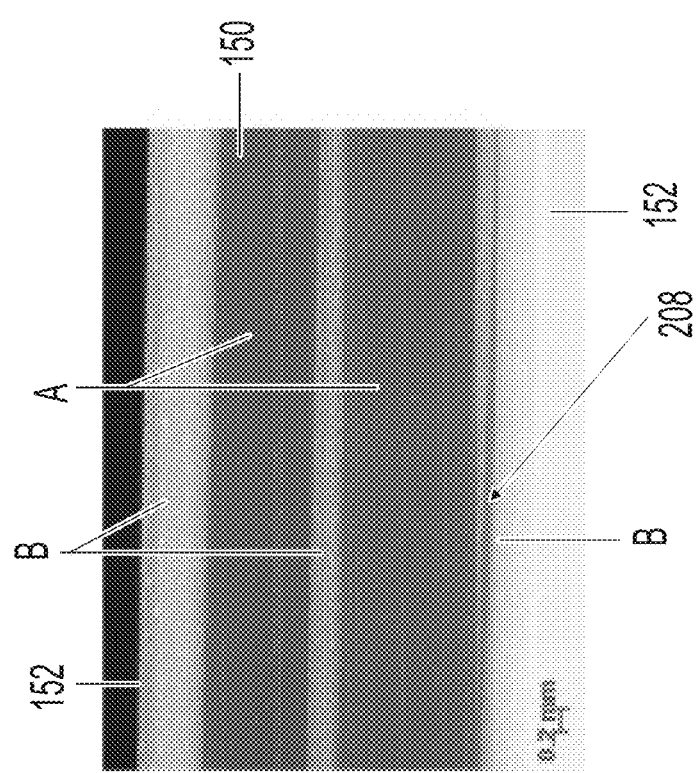
Figure 5J:
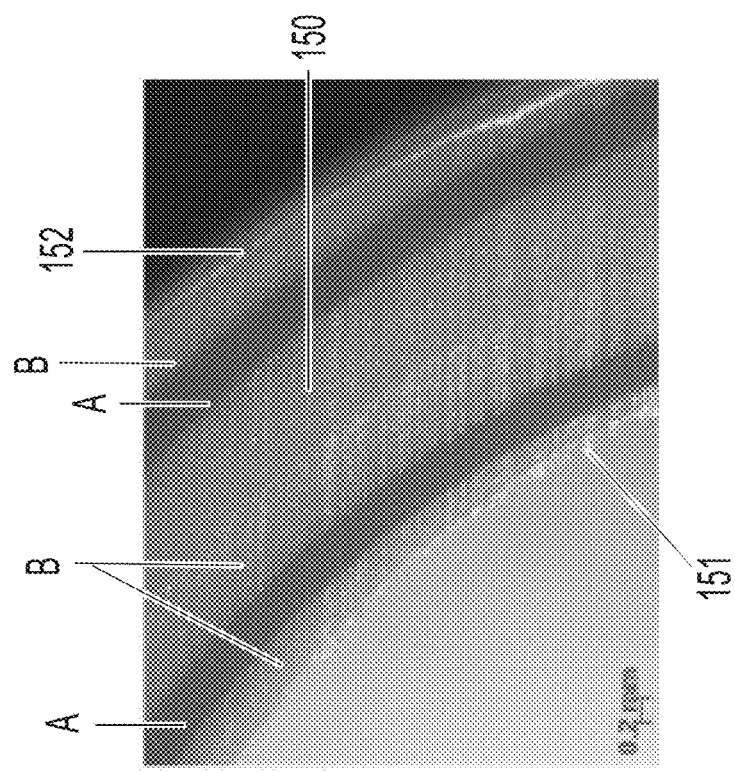
Figure 5I:
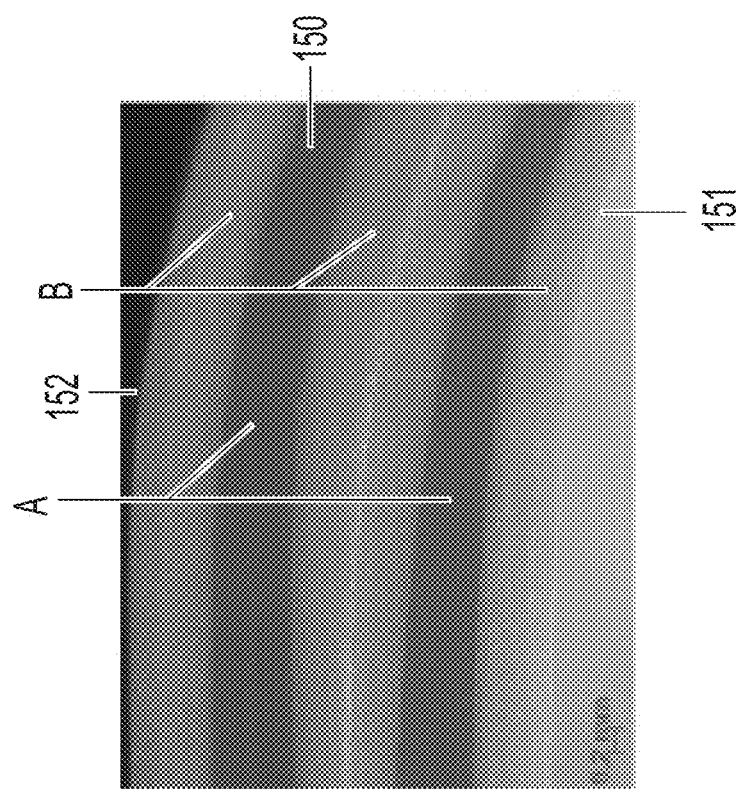

FIG. 5G shows a section, closer to the bottom, than the section in 5F. This image shows forking 208 in the B-layer near the bottom of preform. Again, under visual inspection, this section will probably appear pearlescent and in this instance white.

FIG. 5H shows a section, closer to the bottom, than the section in 5G. FIG. 5H is just above the rounded bottom of the preform. The B-layers are thicker in FIG. 5H. Furthermore, the middle B-layer (sometimes referred to as the core) is tapered. Again, under visual inspection, this section will probably appear pearlescent and in this instance white.

FIGS. I and J show the wall near the rounded bottom of preform.

FIG. 5K shows a section that includes gate 112. The gate will be present in the finished article.

The article can include an appearance gradient extending along at least a portion of the length from a first region (e.g. the glossy region) to a second region (e.g. a matte region). The appearance gradient, including the color gradient and the gloss gradient, can be visually perceptible by a user viewing the exterior surface of the article. The color gradient can extend from a dark intensity to a lighter intensity, or vice versa. In addition, or alternatively, the article can include more than one color gradient along the length of the article, such as, for example, a dark to light gradient followed by a light to dark gradient, followed by an additional dark to light gradient, and so on. The color gradient can extend from a first color to a second color. In one example the color gradient extends from white to a second color or vice versa. The gloss gradient can extend from high gloss to lower gloss, or vice versa. In addition, or alternatively, the article can include more than one gloss gradient along the length of the article, such as, for example, a high gloss to low gloss followed by a low gloss to high gloss gradient, followed by an additional high gloss to low gloss gradient, and so on.

The article can also include a surface roughness gradient extending along at least a portion of the length from a first region to a second region. The gradient can be visually perceptible by a person viewing the exterior surface of the article. In addition, or alternatively, the surface roughness gradient can be felt when a person touches the article, for instance with his/her fingers. The surface roughness gradient can extend from a smooth texture to a matte texture, or vice versa. In addition, or alternatively, the article can include more than one surface roughness gradients along the length of the article, such as, for example, a matte texture to a smooth texture followed by a smooth texture to a matte texture, and optionally followed by an additional matte texture to smooth texture, and so on.

The color gradient and/or the surface roughness gradient can be "visually perceptible" to a viewer. By "visually perceptible" is meant that a human viewer can visually discern the gradient with the unaided eye (excepting standard corrective lenses adapted to compensate for near-sightedness, farsightedness, or stigmatism, or other corrected vision) in lighting at least equal to the illumination of a standard 100-watt incandescent white light bulb at a distance of 0.25 meter.

The gradient can include any suitable color, such as, for example, white, black, red, orange, yellow, green, blue, violet, brown, silver, gold, and/or any other color, or declinations thereof. In certain embodiments, the gradient can be a gradient from blue to white, darker blue to lighter blue, pink to white, darker pink to lighter pink, purple to white, darker purple to lighter purple, red to white, darker red to lighter red, gold to white, lighter gold to darker gold, yellow to white, lighter yellow to darker yellow, green to white, lighter green to darker green, blue to purple, pink to purple, or any other suitable configurations.

A color gradient may be identified by ΔE values along the length or the gradient, which are mathematically expressed by the equation:

$$\Delta E^* = [(L^*_X - L^*_Y)^2 + (a^*_X - a^*_Y)^2 + (b^*_X - b^*_Y)^2]^{1/2}$$

'X' represents a first measuring point and "Y" represents a second measuring point along the gradient.

The color scale values utilized herein to define the gradient are the CIE LAB scale. Measurements are made with a Hunter Color reflectance meter. A complete technical description of the system can be found in an article by R. S. Hunter, 'photoelectric color difference Meter', Journal of the Optical Society of America, Vol. 48, pp. 985-95, 1958. Devices specially designed for the measurement of color on the Hunter scales are described in U.S. Pat. No. 3,003,388 to Hunter et al., issued Oct. 10, 1961. In general, Hunter Color "L" scale values are units of light reflectance measurement, and the higher the value is, the lighter the color is since a lighter colored material reflects more light. In particular, in the Hunter Color system the "L" scale contains 100 equal units of division. Absolute black is at the bottom of the scale (L=0) and absolute white is at the top of the scale (L=100). Thus, in measuring Hunter Color values of the articles according to the present invention, the lower the "L" scale value, the darker the material. The articles herein might be of any color provided that the L Hunter value defined herein is met. When a color is defined according to this system L* represents lightness (0=black, 100=white), a* and b* independently each represent a two-color axis, a* representing the axis red/green (+a=red, −a=green), while b* represents the axis yellow/blue (+b=yellow, −b=blue).

When measured across the color gradient, for instance when you measure at the top of the gradient, near the center of the gradient, and at the bottom of the gradient the L*, a*, and b* values will change. In some instances, the value will increase and in other instances the value will decrease, depending on the color.

As shown in the tables in FIGS. 6A, 6B, and 6C, the L*, a*, and b* vary as the measurements are taken across the length of the bottle, signifying a color gradient in Examples 1, 2, and 3, respectively, discussed in Table 1 and Table 3, hereafter.

The appearance gradient and/or surface roughness gradient can be provided at any suitable location on the article. The appearance gradient and/or surface roughness gradient can extend from the base to the shoulder of the article or from the base to the neck of the article. Alternatively, the appearance gradient and/or surface roughness gradient can extend along only a portion of the length of the article. Alternatively, a series of appearance gradients and/or surface roughness gradients can be provided along the length of the article. Such gradients can be contiguous or separate. In addition, the appearance gradient can extend around any suitable amount of the perimeter of the article, such as, e.g., a portion of the perimeter of the article or substantially the entire circumference of the article.

The articles can appear opaque, as visually perceptible by a person. Although the article can appear opaque, the opacity can vary across the bottle as measured by the Opacity Test Method, described hereafter.

The % opacity can be from about 55% to about 100%, alternatively from about 60% to about 98%, and alternatively from about 65% to about 97%. The % opacity can be from about 70% to about 100%, alternatively from about 72% to about 99%, and alternatively from about 74% to about 97%, and alternatively from about 80% to about 96%. The % opacity can be greater than 50%, greater than 60%, greater than 70%, greater than 75%, greater than 80%, greater than 85%, and greater than 90%. Opacity is measured according to the Opacity Test Method, described hereafter.

The % change in opacity from the opaquest area to the least opaque area can be less than 30%, alternatively less than 25%, alternatively less than 22%, and alternatively less than 20%. The opacity can vary across the gradient, for instance the article can have a greater % opacity in the glossy region than in the matte region, according to the Opacity Test Method.

Figure 7B:
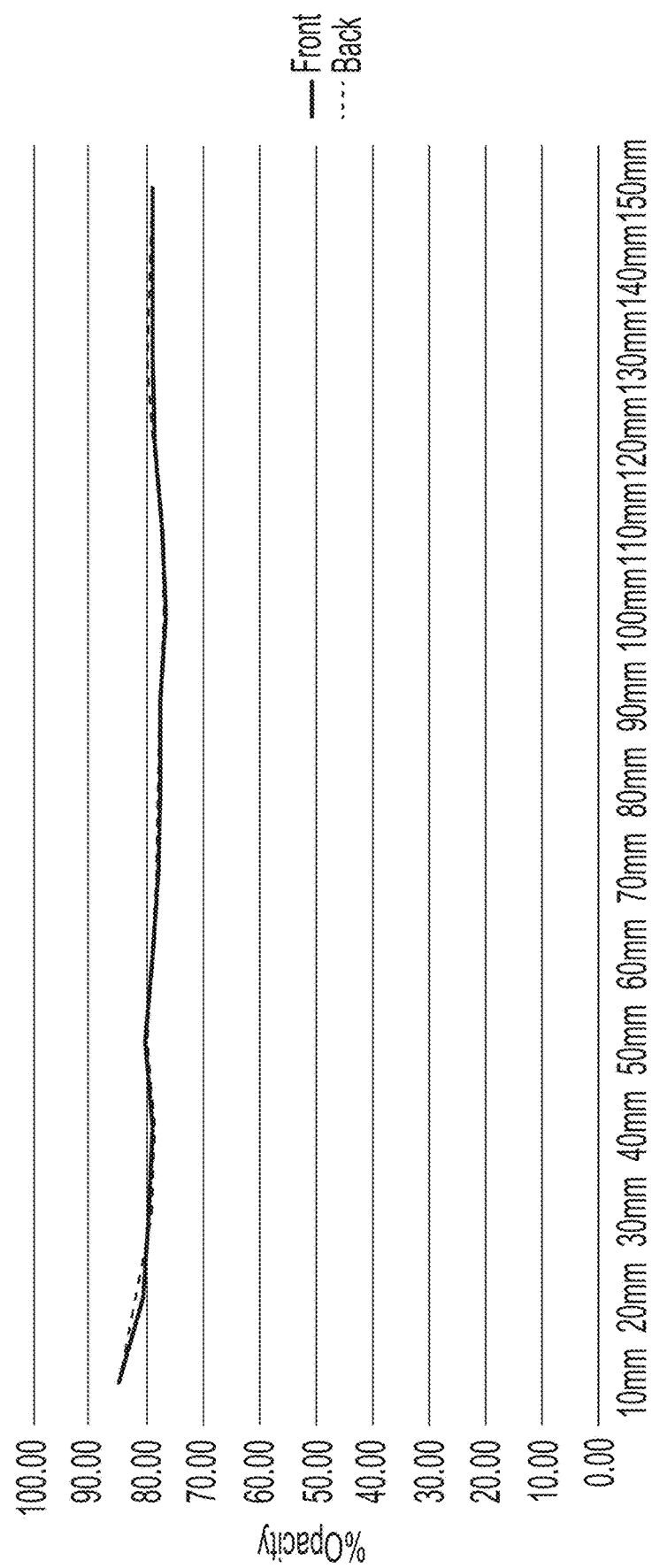
FIG. 7B is a line graph showing the % Opacity vs. Distance for Example 1 using the data in FIG. 7A.
Figure 7D:
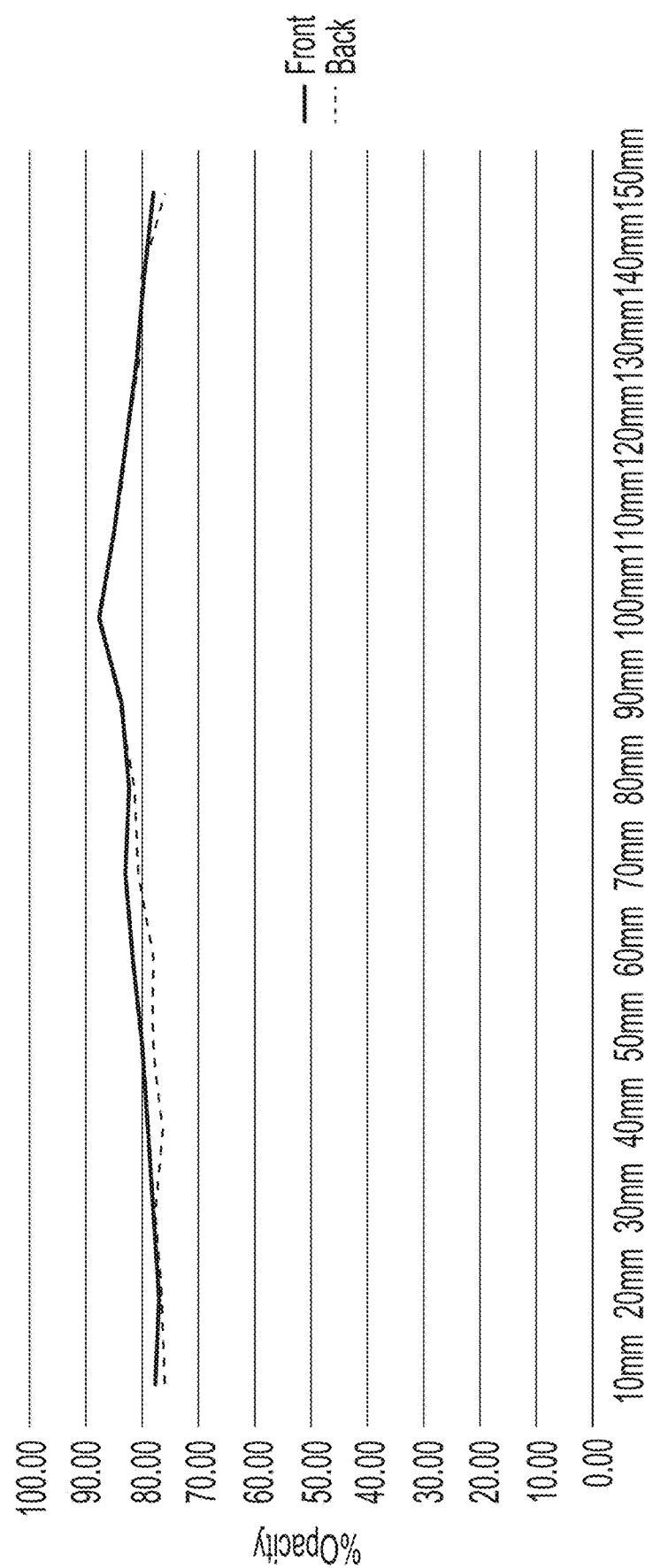
FIG. 7D is a line graph showing the % Opacity vs. Distance for Example 2 using the data in FIG. 7C.
Figure 7F:
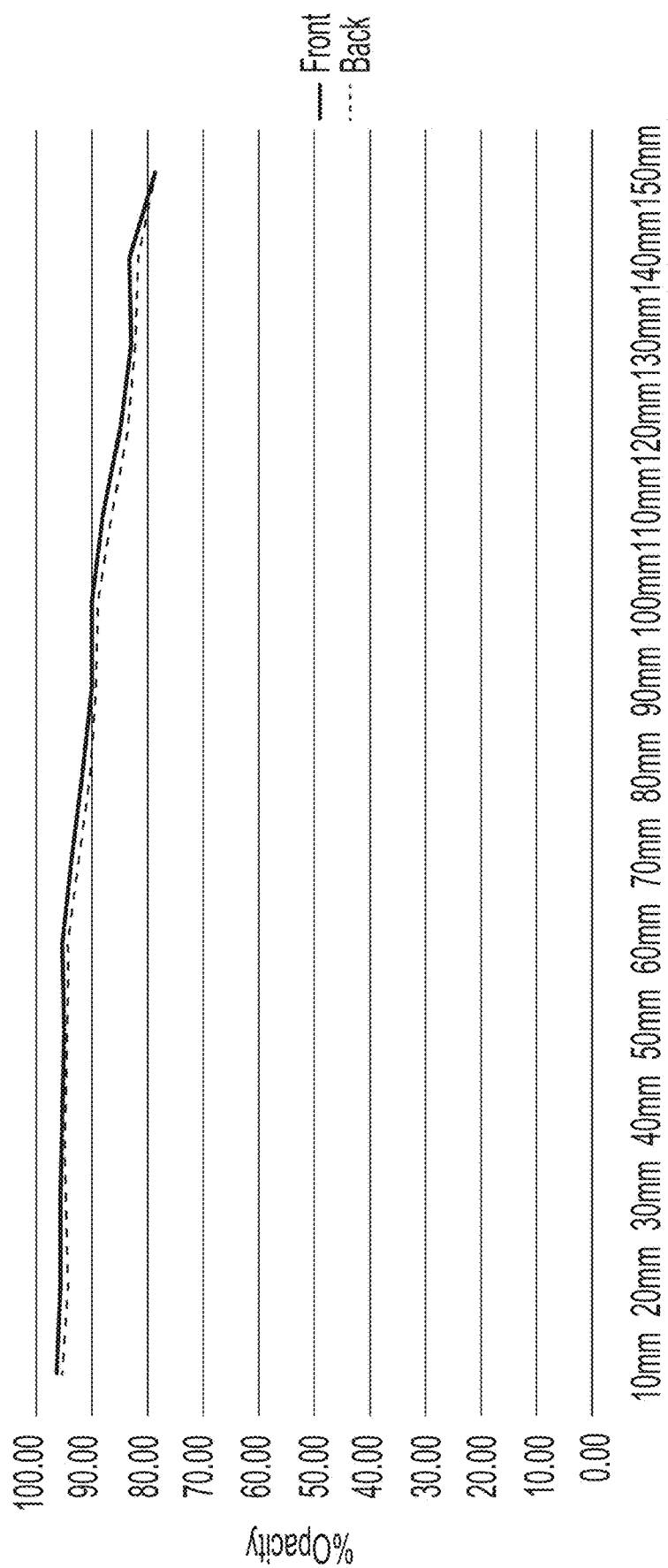
FIG. 7F is a line graph showing the % Opacity vs. Distance for Example 3 using the data in FIG. 7E.

The % Opacity for three example bottles is in FIGS. 7A, 7C, and 7E, corresponding to Examples 1, 2, and 3, respectively, and described in Table 1 and Table 3, discussed hereafter. FIGS. 7B, 7D, and 7F shows the data from FIGS. 7A, 7C, and 7E, respectively, represented as line graphs. FIGS. 7B, 7D, and 7F show that the opacity in these examples is varies little over the length of the bottle. The The article can have a gloss gradient and gloss can vary across the length of the article. The change in gloss 20° can be greater than 50 GUs, greater than 55 GUs, greater than 60 GUs, greater than 65 GUs, greater than 68 GUs, greater than 70 GUs, greater than 72 GUs, greater than 73 GUs, greater than 75 GUs, greater than 80 GUs, and/or greater than 84 GUs. The change in gloss units can be from about 65 GUs to about 95 GUs, from about 70 68 GUs to about 92 GUs, from about 70 GUs to about 90 GUs, from about 72 GUs to about 88 GUs, from about 74 GUs to about 87 GUs, and/or from about 75 GUs to about 85 GUs.

The glossy region can have a location with a gloss 20° of greater than or equal to 65 GUs, greater than or equal to 68 GUs, greater than or equal to 70 GUs, greater than or equal to 71 GUs, greater than or equal to 73 GUs, and/or greater than or equal to 75 GUs. The glossy region can have a location with a gloss 20° of from about 65 to about 110 GUs, from about 68 GUs to about 100 GUs, from about 69 to about 95 GUs, from about 70 GUs to about 90 GUs, and/or 75 GUs to about 85 GUs.

The matte region can have a location with a gloss 20° of less than or equal to 15, less than or equal to 12, less than or equal to 10, less than or equal to 8, less than or equal to 7, and/or less than or equal to 6. The matte region can have a location with a gloss 20° from about 2 to about 13, from about 4 to about 9, and/or from about 5 to about 8.

The gloss 20° can be measured according to the Gloss 20° Method, described hereafter. The highest GU and lowest GU can be determined as follows: the sample panel is removed from the article as described hereafter. Gloss 20° are made every 10 mm along the length of the sample panel. The change is calculated by subtracting the lowest value measured from the highest value measured.

Figure 8B:
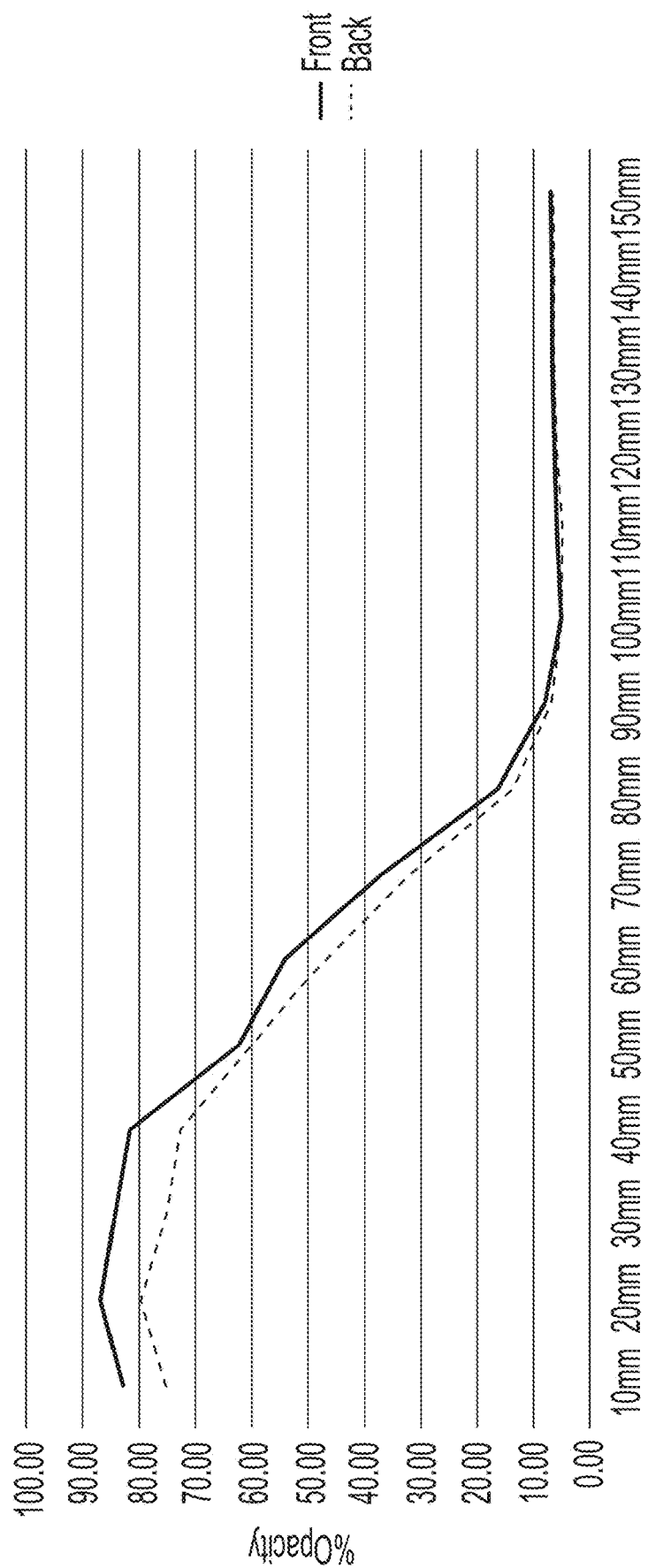
FIG. 8B is a line graph showing the GUs vs. Distance for Example 1 using the data in FIG. 8A.
Figure 8D:
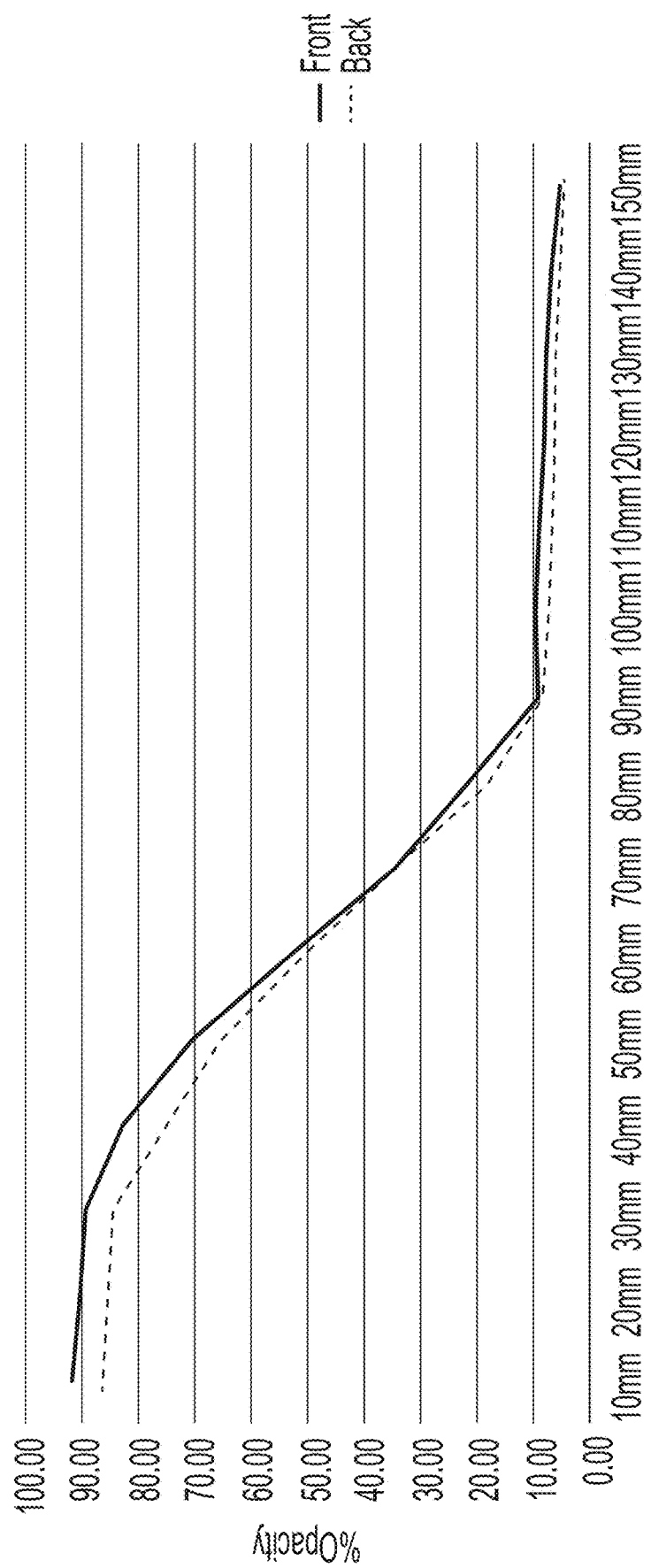
FIG. 8D is a line graph showing the GUs vs. Distance for Example 2 using the data in FIG. 8B.
Figure 8F:
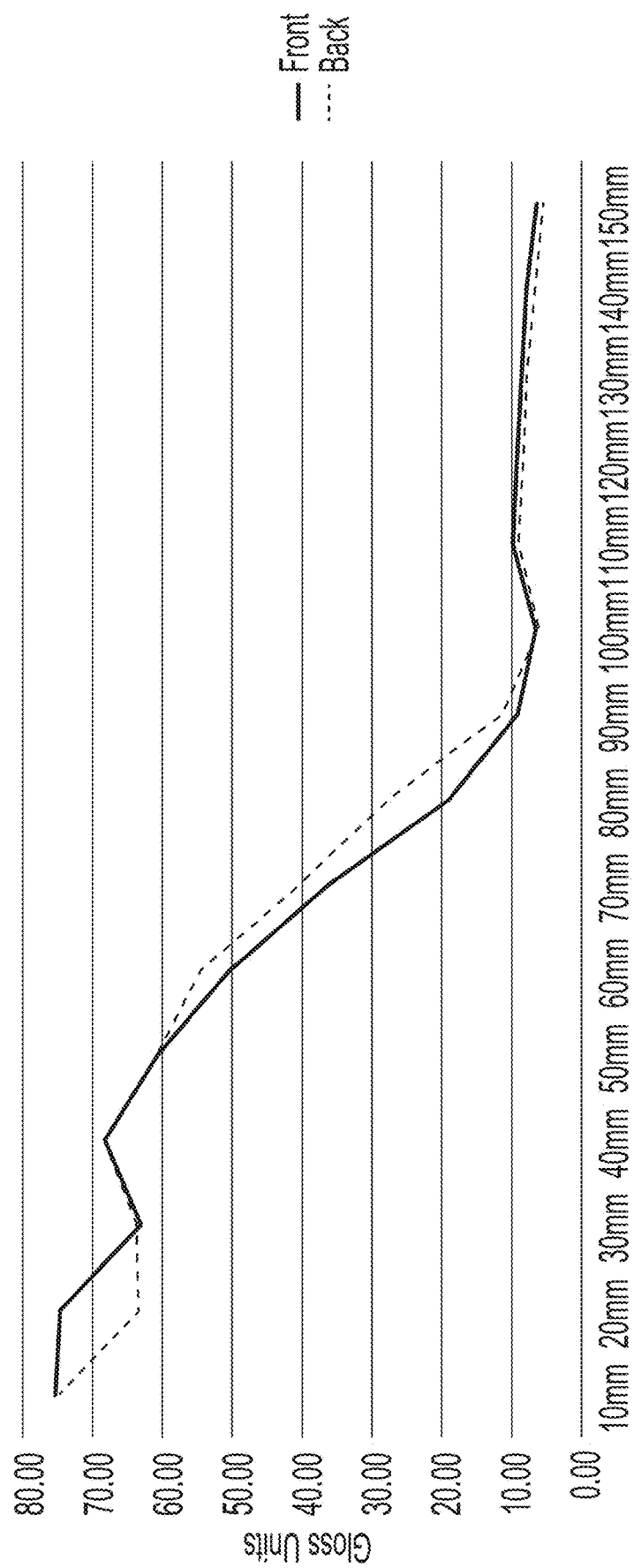
FIG. 8F is a line graph showing the GUs vs. Distance for Example 3 using the data in FIG. 8E.

The gloss 20° for three example bottles is in FIGS. 8A, 8C, and 8E, corresponding to Examples 1, 2, and 3, respectively, and described in Table 1 and Table 3, discussed hereafter. FIGS. 8B, 8D, and 8F shows the data from FIGS. 8A, 8C, and 8E, respectively, represented as line graphs. FIGS. 8B, 8D, and 8F shows that there is an area with continuous, steeper transition, signaling a surface roughness gradient. This area can have a slope with an absolute value of greater than 5, greater than 7, greater than 10, greater than 11, greater than 12, greater than 13, and/or greater than 14 with an $R^2$ value of greater than 0.95. In these examples, the steep transition section is about 50 mm in length.

The article can have a surface roughness gradient and the surface roughness can vary across the longitudinal length of the article. The change in surface roughness can be greater than or equal to 20 μin (0.508 μm), greater than or equal to 25 μin (0.635 μm), greater than or equal to 28 μin (0.7112 μm), greater than or equal to 30 μin (0.762 μm), greater than or equal to 31 μin (0.7874 μm), greater than or equal to 32 μin (0.8128 μm). The change in surface roughness can be from about 18 μin (0.4572 μm) to about 45 μin (1.143 μm), from about 20 μin (0.508 μm) to about 40 μin (1.016 μm), from about 22 μin (0.5588 μm) to about 38 μin (0.9652 μm), from about 25 μin (0.635 μm) to about 35 μin (0.889 μm), and/or from about 28 μin (0.7112 μm) to about 34 μin (0.8636 μm).

The glossy region can have a location with a surface roughness of less than 8 μin (0.2032 μm), 5 μin (0.127 μm), less than 3 μin (0.0762), and/or less than 2 μin (0.0508). The glossy region can have a location with a surface roughness from about 0.5 μin (0.0127 μm) to about 4 μin (0.1016 μm), from about 0.75 μin (0.01905 μm) to about 3.5 μin (0.0889 μm), from about 1 μin (0.0254 μm) to about 3.25 μin (0.08255 μm), from about 1 μin (0.0254 μm) to about 3 μin (0.0762 μm), and/or from about 1.25 μin (0.03175 μm) to about 3 μin (0.0762 μm).

The matte region can have a location with a surface roughness greater than 25 μin (0.635 μm), greater than 28 μin (0.7112 μm), greater than 30 μin (0.762 μm), greater than 31 μin (0.7874 μm), and/or greater than 32 μin (0.8128 μm). The matte region can have a location with a surface roughness from about 20 μin (0.508 μm) to about 42 μin (1.0668 μm), from about 25 μin (0.635 μm) to about 40 μin (1.016 μm), from about 28 μin (0.7112 μm) to about 38 μin (0.9652 μm), and/or from about 30 μin (0.762 μm) to about 36 μin (0.9144 μm). Even though the matte region has a larger surface roughness, as compared to the glossy region, it still feels smooth to a person's touch. The matte region can have a soft feel or feel like mother-of-pearl. However, it does not feel or appear glossy.

Figure 9B:
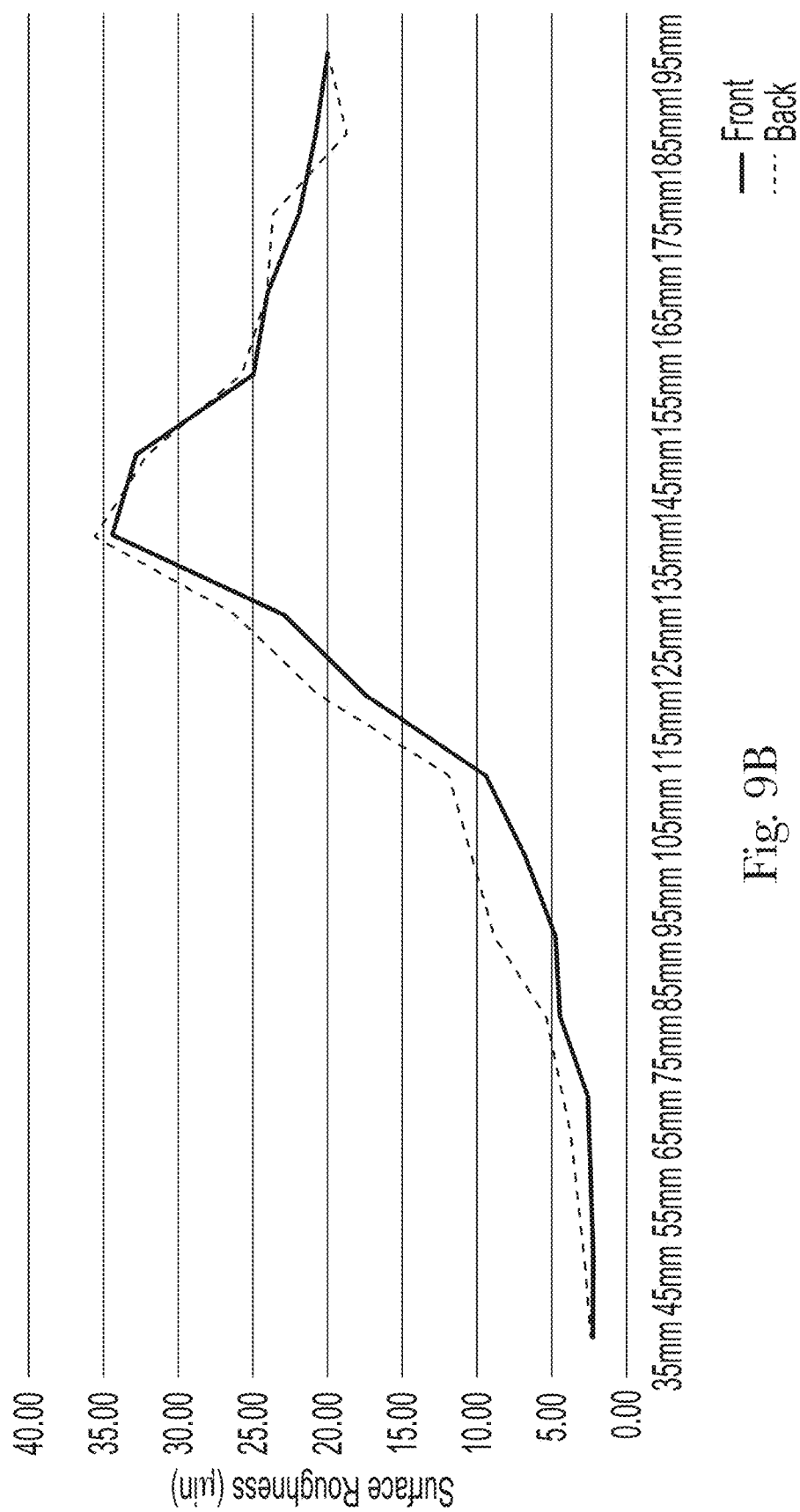
FIG. 9B is a line graph showing the Surface Roughness vs. Distance for Example 1 using the data in FIG. 9A.
Figure 9D:
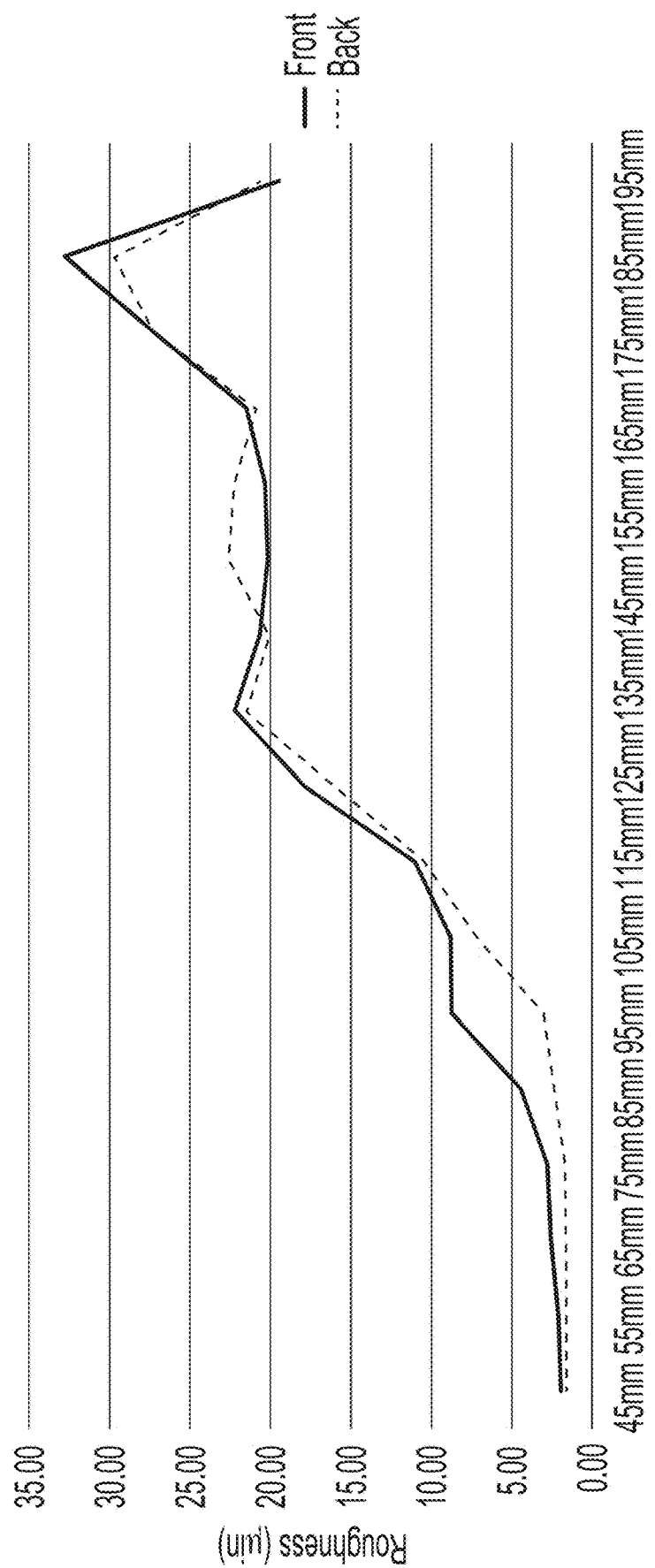
FIG. 9D is a line graph showing the Surface Roughness vs. Distance for Example 2 using the data in FIG. 9C.
Figure 9F:
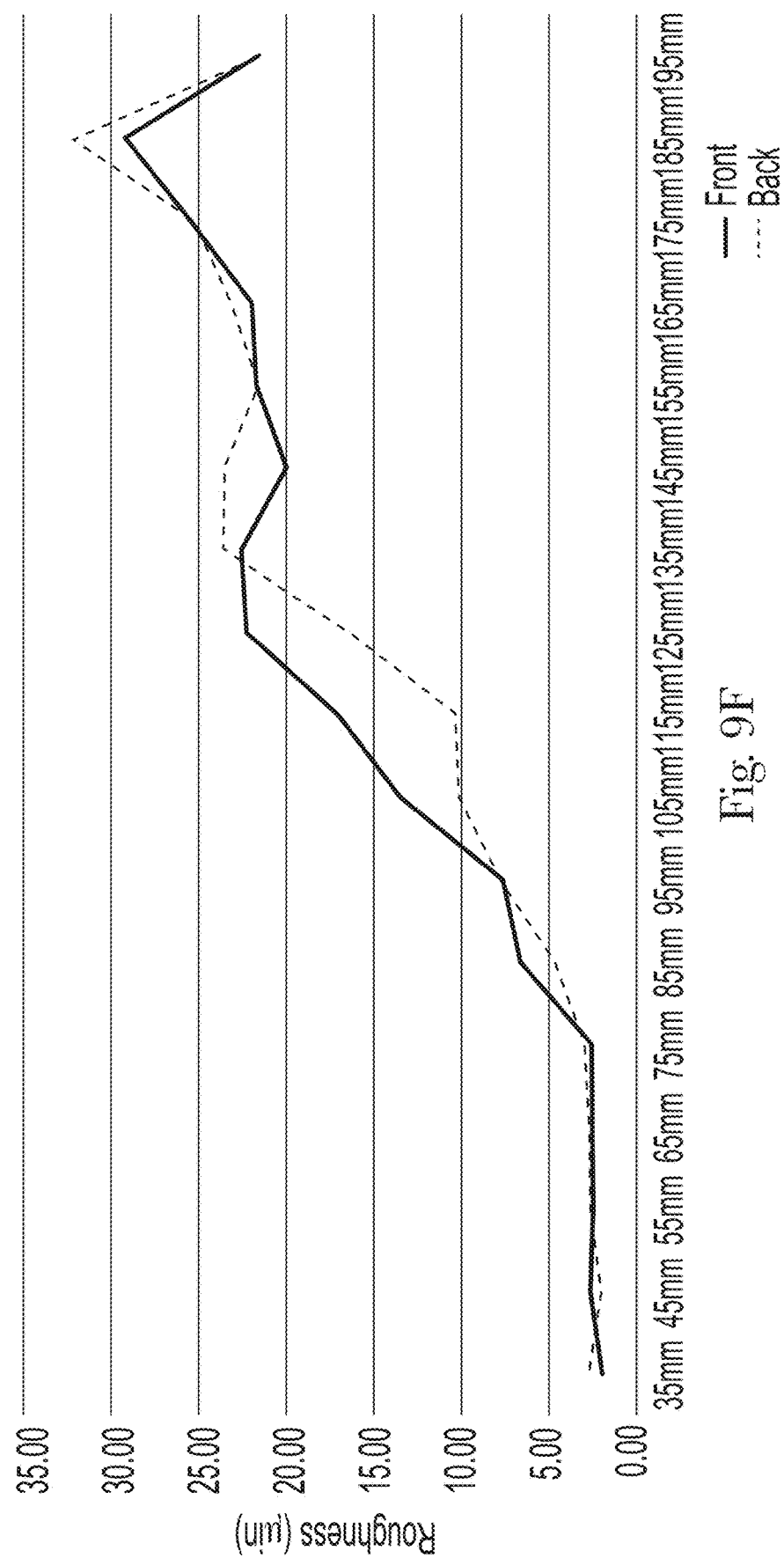
FIG. 9F is a line graph showing the Surface Roughness vs. Distance for Example 3 using the data in FIG. 9E.

The roughness for three example bottles is in FIGS. 9A, 9C, and 9E corresponding to Examples 1, 2, and 3, respectively, and described in Table 1 and Table 3, discussed hereafter. FIGS. 9B, 9D, and 9F shows the data from FIGS. 9A, 9C, and 9E, respectively, represented as line graphs. FIGS. 9B, 9D, and 9F shows that there is an area with continuous, steeper transition, signaling a surface roughness gradient.

It would be understood by one of ordinary skill that linear measurements of the articles depicted in FIGS. 7, 8, and 9 may alternately be taken as a per-cent of the longitudinal length of the article to account for the possibility that articles of different longitudinal lengths can be made using the process as depicted herein. For example, the surface-roughness gradient can begin within 5% of the top of the article, alternately within 10%, 15%, 20%, 30%, 40%, 50%, 60&, 70& 80-% or 90% of the longitudinal length from the top of the article. Similarly, the surface roughness gradient my end within 5% of the bottom of the article, alternately within 10%, 15%, 20%, 30%, 40%, 50%, 60&, 70& 80-% or 90% of the longitudinal length from the bottom of the article The roughness can be measured according to the Surface Roughness Measurement Method, described hereafter. The highest surface roughness and lowest surface roughness can be determined as follows: the sample panel is removed from the article as described hereafter. Surface roughness measurements are made every 10 mm along the length of the sample panel. The change is calculated by subtracting the lowest value measured from the highest value measured.

Furthermore, the articles described herein are less susceptible to delamination as compared to other articles, including monolayer and multilayer articles. Delamination is a constant problem in manufacturing blow molded multilayer hollow articles, such as bottles and containers. Delamination can occur immediately or over time due to the mechanical handling of the container, to thermal stress or mechanical stress. It manifests typically as bubbles (which is actually the separation of the two layers at the interface which can see by a bubble like appearance) on the container surface but can also be at the origin of container failure.

Without being bound by theory, we believe that the parallel flow co-injection, due to a prolonged contact of the materials of the various layers still in molten or partially molten state, leads to the formation of an interface region between the layers wherein the layers are slightly interpenetrated. The interface region generates a good adhesion between the layers and thus makes it much more difficult to separate them. Surprisingly it has also been found that multilayer articles according to the invention have an improved resistance to delamination not only with respect to articles obtained by blow molding of preforms made using step flow co-injection or overmolding, but even with respect to articles obtained from monolayer preforms. In other words, the interface layer appears to further strengthen the article wall with respect to a monolayer execution. Delamination resistance is evaluated measuring the Critical Normal Load, as described hereafter. A higher Critical Normal Load indicates a higher delamination resistance.

The articles can have a critical normal load of greater than or equal to 90 N, greater than or equal to 95 N, greater than or equal to 100 N, greater than or equal to 104 N, greater than or equal to 105 N, greater than or equal to 110 N, and/or greater than or equal to 120 N. The articles can have a critical normal load of from about 90 N to about 170 N, alternatively from about 95 N to about 160 N, alternatively from about 100 N to about 155 N, and alternatively from about 104 N to about 145 N. The critical normal load can be measured by the Critical Normal Load, using the method described hereafter.

In one example, the A-layers and B-layers both contain PET and can have a critical normal load of greater than 100 N. However, PET/PEN, PET/COC (Cyclic olefin copolymer), PET/Nylon, PET/recycled PET or PET/LCP can have lower normal loads. For instance, the normal load of these examples can be greater than 20 N, greater than 30 N. and/or greater than 40 N. Alternatively, the normal load of these examples can be from about 10 N to about 110 N, from about 20 N to about 80 N, from about 30 N to about 70 N, and alternatively, from about 40 N to about 60 N.

Table 1, below, shows seven examples, including Ex. 1-3, which were tested for delamination, according to the Critical Normal Load method. The results are in Table 3 and Table 4, below.

TABLE 1

Delamination Performance Inventive Examples

| | Ex. 1 | Ex. 2 | Ex. 3 |
|---|---|---|---|
| A-Layer | PET + 0.2-0.5% Blue Pigment and Dye | PET + 0.2-0.5% Gold Pigment and Dye | PET + 0.2-0.5% Red Pigment and Dye |
| B-Layer | PET + 6% LDR White Pearl satin masterbatch | PET + 6% LDR White Pearl satin masterbatch | PET + 6% LDR White Pearl satin masterbatch |
| A-Layer | PET + 0.2-0.5% Blue Pigment and Dye | PET + 0.2-0.5% Gold Pigment and Dye | PET + 0.2-0.5% Red Pigment and Dye |
| Thickness of wall (μm) | 530 | 530 | 530 |
| Technology | ISBM[1] | ISBM[1] | ISBM[1] |

TABLE 2

Delamination Performance Comparative Examples

| | Comp. Ex. A | Comp. Ex. B | Comp. Ex. C | Comp. Ex. D |
|---|---|---|---|---|
| A-Layer | PET + 2% transparent orange masterbatch | PET + 3% transparent gold masterbatch | PET | PET + 2% transparent orange masterbatch |
| B-Layer | PET + 4% White Pearl satin masterbatch | PET + 4% White Pearl satin masterbatch | | PET + 4% White Pearl satin masterbatch |
| A-Layer | PET + 2% transparent orange masterbatch | PET + 3% transparent gold masterbatch | | |
| Thickness of wall (μm) | 400 | 300 | 400 | 365 |
| Technology | ISBM[2] | ISBM | ISBM | 2 shot overmolding |

1. Examples 1-3 are made according to the ISBM method described hereafter. Stream-a (containing molten A-layer) forms 70% of the final wall structure and Stream-b (containing molten B-layer) forms 30% of the final wall structure.
2. Comp. Ex. A is made similarly to the examples described herein, except Stream-b is not accelerated to a flowrate that is faster than the flowrate of Stream-a and therefore B-layer is sandwiched between the A-layers in the preform is and when the article is formed. More information regarding Comp. Ex. 1 and the process is found at EPO Publication No. 17196087.5 (P&G Case No. CM04872F).
PET: Laser+® C (E60A) available from DAK Americas LLC
Blue Pigment and Dye-Trans Baby Blue: (Clariant FE53820025)
Gold Pigment and Dye-Trans Gold: (Clariant FP13820093)
Red Pigment and Dye-Urban Red Masterbatch: (Clariant FE 31820014)
Satin Pearl White: (Clariant NE02760182)Orange Masterbatch: E-15796-2 Trans Orange Masterbatch (Clariant NE21760074)Transparent gold masterbatch: (Clariant NEG1760080)

TABLE 3

Delamination Performance Data for Inventive Examples

| | Critical Normal Load (N) | |
|---|---|---|
| Sample | Measured from the glossy region | Measured from the matte region |
| Ex. 1 | 142 | 167 N |
| Ex. 2 | 104 | 159 N |
| Ex. 3 | 125 | 171 N |

TABLE 4

Delamination Performance Data for Comparative Examples

| Sample | Critical Normal Load (N) |
|---|---|
| Comp. Ex. A | 94.8 |
| Comp. Ex. B | 100 |
| Comp. Ex. C | 70 |
| Comp. Ex. D | 12.5 |

Delamination resistance is evaluated measuring the Critical Normal Load, using the method described hereafter. A higher Critical Normal Load indicates a higher delamination resistance. The inventive examples 1, 2, and 3 exhibit higher critical normal load as compared to comparative examples A-D. Therefore, Examples 1, 2, and 3 are more resistant to delamination and have improved adhesion among the layers, as compared to examples A to D. Examples 1-3, especially when delamination was measured from the transparent region, had a higher Critical Normal Load than Comparative Examples A and B, which had three-layers.

Articles and preforms according to the invention are typically made from thermoplastic materials, typically comprising thermoplastic resins.

The article may comprise more than 50% wt., preferably more than 70% wt., more preferably more than 80% wt, even more preferably more than 90% wt. of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP), polymethylpentene (PMP), liquid crystalline polymer (LCP), cyclic olefin copolymer (COC), and a combination thereof. Preferably, the thermoplastic resin is selected from the group consisting of PET, HDPE, LDPE, PP, PVC, PETG, PEN, PS, and a combination thereof. In one example, the thermoplastic resin can be PET.

Recycled thermoplastic materials may also be used, e.g., post-consumer recycled polyethylene terephthalate (PCR-PET); post-industrial recycled polyethylene terephthalate (PIRPET); regrind polyethylene terephthalate.

The thermoplastic materials described herein may be formed by using a combination of monomers derived from renewable resources and monomers derived from non-renewable (e.g., petroleum) resources. For example, the thermoplastic resin may comprise polymers made from bio-derived monomers in whole, or comprise polymers partly made from bio-derived monomers and partly made from petroleum-derived monomers.

The thermoplastic resin used herein could have relatively narrow weight distribution, e.g., metallocene PE polymerized by using metallocene catalysts. These materials can improve glossiness, and thus in the metallocene thermoplastic execution, the formed article has further improved glossiness. Metallocene thermoplastic materials can, however, be more expensive than commodity materials. Therefore, in an alternative embodiment, the article is substantially free of the expensive metallocene thermoplastic materials.

The A-layers and B-layers can be based on the same type of thermoplastic resin (e.g. PET), this can allow a better interpenetration of the layers at the interface due to their chemical compatibility and a more robust wall. For "based on the same type of resin" it is meant that the A-layers and B-layers can contain at least 50%, at least 70%, at least 90%, and/or at least 95% of the same type of resin. For "same type" of resin it is intended resin from the same chemical class i.e. PET is considered a single chemical class. For example, two different PET resins with different molecular weight are considered to be of the same type. However, one PET and one PP resin are NOT considered of the same type. Different polyesters are also not considered of the same type.

The A-layers and B-layers may be formed by the same thermoplastic resin (e.g. PET) and may be different only for the type of colorants and pigments (including effect pigments and/or colored pigments) added.

The articles can comprise one or more sub-layers with various functionalities. For instance, an article may have a barrier material sub-layer or a recycled material sub-layer between an outer thermoplastic layer and an inner thermoplastic layer. Such layered containers can be made from multiple layer preforms according to common technologies used in the thermoplastic manufacturing field. Since barrier material sub-layers and recycled material sublayers can be used in the A-layers (particularly when they do not impact transparency of the A-layers) or B-layer or an additional C-layer.

The article can contain, in any of its layers as long as the required properties of the layer are maintained, additives typically in an amount of from about 0.0001% to about 9%, from about 0.001% to about 5%, and/or from about 0.01% to about 1%, by weight of the article. Non-limiting examples of the additives can include filler, cure agent, anti-statics, lubricant, UV stabilizer, anti-oxidant, anti-block agent, catalyst stabilizer, nucleating agent, and a combination thereof.

Additional gradients and/or visual effects can be created. For example, the A-layer or the B-layer can contain black and/or colored absorption pigments.

The A-layer can also include effect pigments, including effect pigments that are small enough and/or a small enough quantify so the A-layer still appears transparent or partially transparent. For instance, the A-layer can contain a relatively small content of effect pigment having small particle size or an even smaller content of effect pigment having large particles (e.g. to produce a sparkle effect).

The B-Layer can contain opacifying pigments (in addition to or instead of effect pigments). Opacifying pigments can include opacifiers, opaque absorption pigments, and combinations thereof.

Non-limiting examples of opacifiers can include titanium dioxide, calcium carbonate, silica, mica, clays, minerals and combinations thereof. Opacifiers can be any domain/particle with suitably different refractive index from the Thermoplastic Materials (e.g. PET, which can include poly(methyl methacrylate), silicone, liquid crystalline polymer (LCP), polymethylpentene (PMP), air, gases, etc.). Additionally, opacifiers can have the appearance of being white due to scattering of light or black due to absorption of light as well as shades in between as long as they block the majority of light from being transmitted to the layer underneath. Non-limiting examples of black opacifying pigments include carbon black and organic black pigments such as Paliogen® Black L 0086 (BASF).

Opaque absorption pigments can include particles that provide color and opacity to the material in which they are present. Opaque absorption pigments can be inorgainic or organic particulate materials. All absorption pigments can be opaque if their average particle size is sufficiently large, typically larger than 100 nm, alternatively larger than 500 nm, alternatively larger than 1 micrometer, and alternatively larger than 5 micrometers. Absorption pigments can be organic pigments and/or inorganic pigments. Non-limiting examples of organic absorption pigments can include azo and diazo pigments such as azo and diazo lake, Hansas, benzimidazolones, diarylides, pyrazolones, yellows and reds; polycyclic pigments such as phthalocyanines, quinacridones, perylenes, perinones, dioxazines, anthraquinones, isoindolins, thioindigo, diaryl or quinophthalone pigment, Aniline Black, and combinations thereof. Non-limiting examples of inorganic pigments can include titanium yellow, iron oxide, ultramarine blue, cobalt blue, chromic oxide green, Lead Yellow, cadmium yellow and cadmium red, carbon black pigments, and combinations thereof. The organic and inorganic pigments can be used singly or in combination.

Controlling the layer arrangement and the components in the A and B-layers can help to create a unique color profile and transparency to achieve different visual effects, ultimately creating an eye-catching premium appearance. For instance, the A-layers can be transparent and colored, and the B-layer can have silver pearl effect pigment, which can result in a gradient between a matte silver pearl appearance and glossy colored pearl. Alternatively, the A-layers can be opaque and black and combined with B-layers, having an effect pigment which generates an interference color, a gradient blow molded article can be achieved with a gradient from black to intense interference color.

The A-Layers and B-layers can comprise similar resins such as identical grades of PET, dissimilar grades of PET, or virgin PET/recycled PET (rPET). The use of r-PET is desirable due to decreased cost and sustainability reasons. The A-Layers and B-Layers can also comprise different resins which can alternate within the article such as PET/cyclic olefin copolymer, PET/PEN, or PET/LCP. The resin pair is chosen to have optimal properties such as appearance, mechanical, and gas and/or vapor barrier.

The articles can be made according the ISBM process described herein. Articles made using ISBM process (as well as their respective preforms made via injection molding) can be distinguished from similar articles made using different process e.g. extrusion blow molding, for the presence of a gate mark, i.e. a small raised dot which indicates the "gate" where the injection took place. Typically, in the case of container and bottles, the "gate mark" is present at the bottom of the article.

The ISBM process starts with making a preform. In ISBM, the preform can be made by co-injection molding. Here, as the material of the outer layer flows into the mold cavity, the material next to the core and cavity walls freezes and material flows down a center channel. When the material of the Stream-b (which comprises the effect pigment and/or the opacifying pigment in a thermoplastic resin) enters, it has a flowrate exceeding that of Stream-a (that forms the transparent B layer(s)) causing the Stream-b to push past the initial flow front. This Stream-b now leads in the injection process whereby it becomes the new outer layer within the same mold cavity and as it flows ahead it continues to solidify on the walls producing the outer layer. This effectively creates a preform part with two different streams solidified at the outer surface. The preform has a wall with varying number of layers dependent on processing conditions and which material is resulting in the outer layers.

Here, the unique visual appearance of the article can be achieved by making significant modifications to the standard process described above and the preform can be made as follows: First, the preforms can be made using the parallel flow co-injection method, where the injection of the streams are initiated within 5 seconds of each other.

The injection flow of the materials typically occurs as follows: The initial injection of Stream-a (containing molten A-layers) is followed by the injection of Stream-b (containing molten B-layers) with an approximate delay of 1-2 seconds. At the desired time and after the streams are inserted in the preform mold, Stream-b is accelerated to a flowrate that is faster than the flowrate of Stream-a. This results in Stream-b blowing through Stream-a and in Stream-b flowing to the outside of Stream-a. Thus, part of Stream-b partially forms the outside surface of the preform, bringing the effect pigment on the outside layer and creating the appearance gradient and/or surface roughness gradient effect.

As seen in many of the images in FIGS. 5A-K in the walls of preform (and eventually the walls of the finished product) there can be forks in the B-layer. These forks are due to the formation of thread-like flows which form by the Stream-b as it progresses in the viscous environment of the Stream-a. These flows do not follow typical thread-like breakup as seen in typical fluids. The process is characterized by the elongation of the fluid mass forming thin, thread-like regions between larger nodules of viscous fluid. The thread-like regions would typically continue to thin until they break, forming individual droplets of fluid. In this case, Stream-b is sufficiently viscous that the surface perturbations that lead to breakup are almost fully damped. This minimal surface energy state results in the production of long filaments of Stream-b that continue to thin into smaller threads and avoid breakup into individual drops.

An example of a fork is a single flow of Stream-b which tapers (becomes thinner) axially along the article and can split to form multiple flows consisting mainly of Stream-b. Likewise, the flow of Stream-a can taper in an opposite manner to Stream-b and the flow can be split into multiple flows. The ability to fork either or both Stream-a and b can control the appearance and surface roughness of the article in a gradual manner.

The desired time can be controlled depending on the desired visual effect. Of course, the operator may choose to start with Stream-b leading in the beginning and later accelerating Stream-a for a different visual effect. In any case, the timing of the steam acceleration will determine the visual effect, i.e. whether the neck, base, or body or portions thereof of the article will have the pigments on the outer surface.

It has been found that, during the production of preforms for the present invention, a tight control of the temperatures can be beneficial to the regularity of the layers, in part by impacting the viscosity of the thermoplastic materials. The material for Stream-b (containing molten B-layer) should be injected at a similar temperature to the material for Stream-a (containing molten A-layer). A preferred temperature range for the material of Stream-a (containing molten A-layer) is between about 240° C. and about 305° C., alternatively from about 250° C. to about 300° C., alternatively from about 270° C. to about 290° C., alternatively from about 275° C. to about 285° C., and/or about 280° C. measured at the point of injection. The material for Stream-b (containing molten B-layer) can be at a temperature in a range from about 260° C. and about 310° C., alternatively from about 270° C. to about 300° C., alternatively from about 275° C. to about 285° C., and alternatively greater than or equal to about 280° C., measured at the point of the injection. The temperature of Stream-b can be higher than Stream-a. The temperatures can vary depending on the thermoplastic resins and the pigment loading of the stream. Lower temperatures and higher viscosities of the streams contribute to a better and more uniform formation of the layers. The difference between the viscosity of the streams need to be monitored well and adjusted to prevent malformed layers or anomalies in the flow, which can comprise the integrity of the final article.

Another process parameter, which must be controlled during the co-injection process of making the preforms, is the pressures of the streams, which are measured along the manifold line supplying the injection nozzle. Stream-a (which forms layer A) is preferably kept in the range between about 25 bar and about 400 bar, alternatively from about 30 bar to about 40 bar, and alternatively from about 34 to about 36 bar, while the lower temperature/higher viscosity Stream-b (which forms B-layer) is preferably kept in a range between about 1000 and about 1600 bars.

In order to preserve transparency of the A-layers, it is beneficial to quickly cool down the preform as soon as it is formed. The same it is true for the fast cooling of the article after it is formed from the stretch blow molding operation. A prolonged exposure at temperatures close to the glass transition temperature (Tg) of the resin may promote crystallization of the resin which in turn may be detrimental to transparency. Rapid cooling maintains an amorphous, transparent structure as much as possible.

When the preform is then released from the preform mold it can be immediately processed but more typically is cooled and stored and processed at a stretch blow molding station at a subsequent time and/or location. In a second step the preform is introduced into a stretch blow molding equipment where the preform is blow molded to its final shape via heating and stretching, typically using a core rod. In the ISBM process, differently than with other blow molding processes, the preform is reheated to a temperature warm enough to allow the preform to be inflated so that a biaxial molecular alignment in the sidewall of the resulting blow-molded container is achieved. With the preform held at the neck, air pressure, and usually a stretch rod, are used to stretch the preform in the axial direction, and optionally also in the radial direction. In the case of bottles the neck portion of the article can contain threads or flanges suitable for a closure and are typically unchanged with respect to the preform as the neck part is often not stretched. The articles obtained by injection stretch blow-molding can be significantly longer than the preform. More information on injection stretch blow-molding processes can be obtained from general textbooks, for example "The Wiley Encyclopedia of Packaging Technology", Second Edition (1997), published by Wiley-Interscience Publication (in particular see pages 87-89).

Many variations are possible to these steps, for instance the preform can be stretch molded blow within the same machine where the preform is made, but the two steps/two machines process is far more common.

The multilayer articles can be made by blow molding a co-injected preform wherein the preform can be made via parallel flow co-injection.

Test Methods

When the article is a container or a bottle, the critical normal load, gloss 20°, opacity, and spectrophotometry, measurements were all performed on a sample panel that was removed from the article. Samples with dimensions of 100 mm in length and about 50 mm in width are cut out from the main portion of the article wall and at last 50 mm away from should/neck and base regions.

When the article does not allow taking a sample this large, shorter samples in scale 1:2 width: length may be used as detailed further below. For containers and bottles, the sample is preferably removed from the label panel of the bottle at least 50 mm away from shoulder/neck or base regions. The cutting is done with a suitable razor blade or utility knife such that a larger region is removed, then cut further down to suitable size with a new single edge razor blade.

The samples should be flat if possible or made flat by using a frame maintaining the sample flat at least in the region where the test is done. It is important that the sample is flat to determine the Critical Normal Load, the gloss 20°, profilometry, opacity, and spectrophotometry.

Critical Normal Load (N) and Scratch Depth at Region of Failure

If the sample readily delaminates upon removal from the bottle, the sample is given a score of 0 N for the "Critical Normal Load". For samples which remain intact, they are subjected to scratch-induced damage using a Scratch 5 from Surface Machine Systems, LLC according to Scratch Test Procedures (ASTM D7027-13/ISO 19252:08) using a 1 mm diameter spherical tip, Initial Load: 1 N, End Load: 125 N, Scratch Rate: 10 mm/s, and Scratch Length of 100 mm. For samples smaller than 100 mm, the Scratch Length can be decreased while keeping the initial and end loads the same. This provides an estimate of the Critical Normal Load. Using this estimate, additional samples can be run over a narrower load range to provide more accurate determination of the Critical Normal Load.

Scratch-induced damage is performed on both sides of the sample corresponding to the inner and outer surface of the bottle. It is critical that the sample is affixed to the sample stage by the use of foam-based double-sided tape such as Scotch® Permanent Mounting Tape by 3M (polyurethane double-sided high-density foam tape with acrylic adhesive having a total thickness of about 62 mils or 1.6 mm, UPC #021200013393) on the underside of the sample. All samples are cleaned with compressed air before the scratch test.

The Point of Failure is visually determined after completing the scratch test as the distance across the length of the scratch at which the onset of visible delamination occurs. Delamination introduces an air gap between layers which is visible to the naked eye or with assistance of a stereomicroscope by one skilled in the art. as. This is validated based on a minimum three scratches per each side of the sample (defined as the cut out from bottle above) with a standard deviation of 10% or less. The side with lower Critical Normal Load is reported as the result of this method. The Scratch Depth at Region of Failure is measured according to ASTM D7027 across the scratch location at the point which the onset of delamination occurs. The Critical Normal Load (N) is defined as the normal load recorded at the location determined to be the Point of Failure. A Laser Scanning Confocal Microscope (KEYENCE VK-9700K) and VK-X200 Analyzer Software is used to analyze scratch-induced damage including the Point of Failure, Scratch Width, and Scratch Depth.

Gloss 20° Method

Gloss 20° is measured with a gloss meter at 20° micro-TRI-gloss (BYK-Gardner GmbH) according to ASTM D 2457/D523. Each point is measured three times and the mean is calculated to determine the gloss 20°. All gloss measurements were done over black background which we refer to as "Base Black." Base Black is the black area from the X-Rite Grey Scale Balance Card (45as45 L*a*b* 21.077 0.15-0.29). The measurements provided by the Micro-Tri Gloss meter have the unit "GU" which stands for "gloss units."

Local Wall Thickness

Wall thickness at specific locations was measured using an Olympus Magna-Mike® 8600 using a ⅛" dia. target ball.

Three measurements were taken at each location and the mean was calculated to determine the local wall thickness.

The average local wall thickness was determined by determining the local wall thickness as described above across the length of the article or panel and then calculating the mean. The thickness near the shoulder and near the base is excluded from the average local wall thickness.

Surface Roughness Measurement Method

Method 1: A sample panel is analyzed for Ra (arithmetical mean height) using a portable surface roughness tester such as the Surftest SJ-210 (Mitutoyo America Corporation) was placed at an even height of the bottle. The roughness is measured in units of μin.

Opacity Test Method

Opacity is measured on cut out portions of the bottle with a portable densitometer such as the X-rite 341C (X-Rite, Inc.) with 3 mm diameter aperture. The absolute optical density (D) is measured and then converted to Transmission (T) by $D=-\log_{10} T$ where % Opacity is 100-% T. Optical density (D) of 5.00=100% Opaque and 0.00=0% Opacity. Each point is measured three times and the mean is calculated to determine the % Opacity.

Combinations

A. A blow molded multilayer article comprising:
   a hollow body defined by a wall comprising an inner surface and an outer surface,
   wherein at least a first portion of the wall comprises at least five layers comprising at least two A-layers and at least two B-layers forming the outer surface and the inner surface;
   wherein the A-layers are transparent and optionally comprise a colored dye or pigment;
   wherein the B-layers comprise an effect pigment and/or an opacifying pigment;
   wherein the A-layers and B-layers comprise a thermoplastic resin;
   wherein the outer surface comprises an axial color gradient and/or a gloss gradient formed by constituents from the A-layers and B-layers.

B. The article according to Paragraph A wherein at least a second portion of the wall comprises at least three layers comprising:
   at least one B-layer located between the outer surface and the inner surface of the walls;
   and at least two A-layers forming the outer surface and inner surface of the wall;
   wherein the B-layer is located between the A-layers;
   wherein the effect pigment or opacifying pigment is visible through the A-layers.

C. The article according to Paragraph B wherein the B-layer extends over the entire length of article wall and wherein the B-layer comprises a variable thickness and wherein the B-layer is thicker in the first portion than the second portion.

D. The article according to Paragraphs A-C wherein at least one of the B-layers forks.

E. The article according to Paragraphs A-D wherein the article has a change in surface roughness along the length of the article of from about 18 μin (0.4572 μm) to about 45 μin (1.143 μm), preferably from about 20 μin (0.508 μm) to about 40 μin (1.016 μm), more preferably from about 22 μin (0.5588 μm) to about 38 μin (0.9652), and even more preferably from about 25 μin (0.635 μm) to about 35 μin (0.889 μm).

F. The article according to Paragraphs B-E wherein the second portion is a glossy portion comprising a surface roughness of less than 8 μin (0.2032 μm), preferably 5 μin (0.127 μm), more preferably less than 3 μin (0.0762), and even more preferably less than 2 μin (0.0508 μm).

G. The article according to Paragraphs A-F wherein the first portion is a matte region comprising a surface roughness of from about 20 μin (0.508 μm) to about 42 μin (1.0668 μm), preferably from about 25 μin (0.635 μm) to about 40 μin (1.016 μm), more preferably from about 28 μin (0.7112 μm) to about 38 μin (0.9652 μm), and even more preferably from about 30 μin (0.762 μm) to about 36 μin (0.9144 μm).

H. The article according to Paragraphs A-G wherein the article has a change in gloss 20° along the length of the article wherein the change is greater than 50 GUs, preferably greater than 65 GUs, more preferably greater than 70 GUs, and even more preferably greater than 75 GUs.

I. The article according to Paragraphs A-H wherein the second portion is a glossy region comprising a location with a gloss 20° from about 65 to about 110 GUs, preferably from about 68 GUs to about 100 GUs, more preferably from about 69 to about 95 GUs, and even more preferably from about 70 GUs to about 90 GUs.

J. The article according to Paragraphs A-I wherein the first portion is a matte region comprising a location with a gloss 20° of less than or equal to 15, preferably less than or equal to 12, more preferably less than or equal to 10, and even more preferably less than or equal to 7.

K. The article according to Paragraphs A-J wherein the article has an opacity of from about 70% to about 100%, preferably from about 75% to about 95%, and more preferably from about 80% to about 93%.

L. The article according to Paragraphs A-K wherein the % opacity can be greater than 70%, preferably greater than 75%, more preferably greater than 80%, and even more preferably greater than 85%.

M. The article according to Paragraphs K-L wherein the opacity varies by less than 30%, preferably less than 25%, more preferably less than 22%, and even more preferably less than 20% over the length of the article.

N. The article according to Paragraphs A-M wherein the article is a bottle further comprising a neck defined by the wall having an inner surface and an outer surface; wherein the neck does not comprise a color gradient; and wherein a portion of the outer surface of the neck comprises A-layer and wherein a portion of the outer surface of the neck comprises B-layer.

O. The article according to Paragraphs A-N wherein the article had a Critical Normal Load greater than 100 N, preferably greater than 105, and more preferably greater than 110.

P. The article according to Paragraphs A-O wherein the effect pigment is a pearlescent pigment and wherein the effect pigment comprises from about 0.01% to about 10%, by weight of the B-layers.

Q. The article according to Paragraphs A-P wherein the wall comprises a thickness of about 250 μm to about 1 mm, preferably from about 300 μm to about 700 μm, and more preferably from about 400 μm to about 600 μm, and even more preferably from about 450 μm to about 575 μm and the average thickness of the wall panel varies by less than 30% over the length of the article.

R. The article according to Paragraphs A-Q wherein the thermoplastic resin is selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), polypropylene (PP), and a combination thereof.

S. The article according to Paragraph R wherein the multilayer article comprises polyethylene terephthalate.

T. The article according to Paragraphs A-S wherein the article has a non-cylindrical shape.

U. A method for making a blow molded article comprising the following steps:
 a. providing a preform mold for making a preform;
 b. injecting Stream-a comprising a molten thermoplastic resin into the preform mold with a flowrate-a;
 c. within 0-2 seconds of injecting Stream-a, injecting Stream-b comprising the molten thermoplastic resin and an effect pigment and/or an opacifying pigment into the preform mold with an initial flowrate-b;
 d. accelerating the flowrate-b so it is faster than flowrate-a;
 e. Stream-b blows through Stream-a and flows to the outside of Stream-a;
 f. cooling to form a preform comprising an outside surface wherein at least a portion of the outside surface comprises a solidified Stream-b creating the appearance gradient and/or the surface gradient;
 g. blow molding the preform to form the article of Paragraphs A-T.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A blow molded multilayer article comprising:
a hollow body defined by a wall comprising an inner surface and an outer surface,
wherein at least a first portion of the wall comprises at least five layers comprising
at least two A-layers and at least two B-layers forming the outer surface and the inner surface;
wherein the A-layers are transparent and optionally comprise a colored dye or pigment;
wherein the B-layers comprise an effect pigment and/or an opacifying pigment;
wherein the A-layers and B-layers comprise a thermoplastic resin;
wherein the outer surface comprises an axial color gradient and/or a gloss gradient formed by constituents from the A-layers and B-layers
wherein at least a second portion of the wall comprises at least three layers comprising:
at least one B-layer located between the outer surface and the inner surface of the wall;
and at least two A-layers forming the outer surface and inner surface of the wall;
wherein the B-layer is located between the A-layers;
wherein the effect pigment is visible through the A-layers; and
wherein at least one of the B-layers forks.

2. The blow molded multilayer article of claim 1 wherein the B-layer extends over the entire length of article wall and wherein the B-layer comprises a variable thickness and wherein the B-layer is thicker in the first portion than the second portion.

3. The blow molded multilayer article of claim 1 wherein the first portion is a matte region with a surface roughness of from about 25 µin to about 40 µin.

4. The blow molded multilayer article of claim 1 wherein the second portion is a glossy portion with a gloss 20° of from about 75 GUs to about 110 GUs.

5. The blow molded multilayer article of claim 1 wherein the article is a bottle further
comprising a neck defined by the wall having an inner surface and an outer surface;
wherein the neck does not comprise a color gradient;
and wherein a portion of the outer surface of the neck comprises A-layer and
wherein a portion of the outer surface of the neck comprises B-layer.

6. The blow molded multilayer article of claim 1 wherein the article has an opacity of from about 70% to about 95% and wherein the opacity varies by less than 25% over the length of the article.

7. The blow molded multilayer article of claim 1 wherein the article had a Critical Normal Load greater than 100 N.

8. The blow molded multilayer article of claim 1 wherein the effect pigment is a pearlescent pigment and wherein the effect pigment comprises from about 0.01% to about 10%, by weight of the B-layers.

9. The blow molded multilayer article of claim 1 wherein the wall comprises a thickness of about 250 µm to about 1 mm and the average thickness of the wall panel varies by less than 30% over the length of the article.

10. The blow molded multilayer article of claim 1 wherein the thermoplastic resin is selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), polypropylene (PP), and a combination thereof.

11. The blow molded multilayer article of claim 10 wherein the multilayer article comprises polyethylene terephthalate.

12. The blow molded multilayer article of claim 1 wherein the article has a non-cylindrical shape.

* * * * *